(12) United States Patent
Allen

(10) Patent No.: US 7,376,941 B2
(45) Date of Patent: May 20, 2008

(54) INFERRING FUNCTION CALLS IN AN AMBIGUOUS LANGUAGE COMPUTER PROGRAM

(75) Inventor: John R. Allen, Los Altos, CA (US)

(73) Assignee: Agility Design Solutions Inc., Palo Alto, CA (US)

( * ) Notice: Subject to any disclaimer, the term of this patent is extended or adjusted under 35 U.S.C. 154(b) by 944 days.

(21) Appl. No.: 10/826,978

(22) Filed: Apr. 16, 2004

(65) Prior Publication Data

US 2005/0235265 A1    Oct. 20, 2005

(51) Int. Cl.
*G06F 9/45* (2006.01)
(52) U.S. Cl. ..................................... 717/157
(58) Field of Classification Search ............... 717/157; 709/223
See application file for complete search history.

(56) References Cited

U.S. PATENT DOCUMENTS

| | | | | |
|---|---|---|---|---|
| 5,615,369 | A | 3/1997 | Holler | 395/709 |
| 6,671,874 | B1 * | 12/2003 | Passova | 717/126 |
| 2005/0027838 | A1 * | 2/2005 | Magid | 709/223 |

OTHER PUBLICATIONS

Luiz De Rose & David Padua, "Techniques for the Translation of MATLAB Programs into Fortran 90", ACM Transactions on Programming Languages and Systems, vol. 21, No. 2, Mar. 1999 pp. 286-323.

George Almasi & David Padua, "MaJIC: Compiling MATLAB for Speed and Responsiveness", Department of Computer Science University of Illinois at Urbana-Champaign, PLDI'02, Jun. 17-19, 2002, Berlin, Germany, pp. 294-303.
Steven S. Muchnick, "Advanced Compiler Design and Implementation", Academic Press, 1997, pp. 217-266.
Steven S. Muchnick & Neil D. Jones "Program Flow Analysis: Theory and Applications", Prentice Hall Publisher ,1981, pp. 1-54.
Karen Pieper "Parallelizing compilers: Implementation and effectiveness" PhD. thesis, Stanford Computer Systems Laboratory, Jun. 1993, pp. 70-121.
Randy Allen & Ken Kennedy, "Optimizing Compilers for Modern Architectures", Morgan Kaufmann publishers, 2002, Chapter 4 pp. 135-317.
De Rose, L. et al., "A MATLAB to Fortran 90 Translator and its Effectiveness", Mar. 1996, pp. 9.

(Continued)

*Primary Examiner*—John Chavis
(74) *Attorney, Agent, or Firm*—Silicon Valley Patent Group LLP; Omkar Suryadevara

(57) ABSTRACT

An ambiguous usage of a name in a statement of a computer program is resolved at least partially by adding to an entry statement thereof a definition that includes the ambiguously used name followed by constructing a definition-use graph, followed by checking whether or not an edge from the added definition reaches the statement containing the ambiguously used name. If all edges into the ambiguous statement are from the added definition, then the name is deemed to be a function call. If all edges into the ambiguous statement are not from the added definition, then the name is deemed to be a memory access. If some edges into the ambiguous statement are from the added definition but other edges are not, then the statement is flagged as a dual usage.

40 Claims, 22 Drawing Sheets

OTHER PUBLICATIONS

"MATLAB: The Language of Technical Computing - Using MATLAB Version 6", The Mathworks, Inc., 2002, pp. 3-1 to 3-14; 21-20 to 21-22.

De Rose, L. "Compiler Techniques for MATLAB Programs", 1996, Urbana, Illinois, p. 120.

Allen, R. "Compiling High-Level Languages to DSP's", May 1005, IEEE Signal Processing Magazine, pp. 47-56.

Wegman, M. N. et al. "Constant propagation with conditional branches", ACM Transactions on Programming Languages and Systems, Apr. 1991, vol. 13, No. 2, pp. 181-210.

Aho, A. V. et al. Chapter 2 in a book "Compilers: Principles, Techniques, and Tools", 2006, 2$^{nd}$ Edition, pp. 25-82.

"MATLAB: The Language of Technical Computing - Using MATLAB Version 6", The Mathworks, Inc., 2002, pp. 16-1 to 16-14; 21-64 to 21-69.

Entire Prosecution History of U.S. Appl. No. 11/698,252 filed on Jan. 24, 2007 by James G.Peterson et al.

* cited by examiner

FIG. 6A
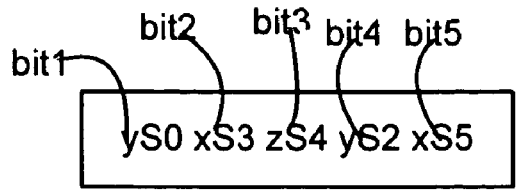
FIG. 6B
|    | DEFINES | KILLS | REACHES | USES  |
|----|---------|-------|---------|-------|
| S0 | 10000   | 10010 | 00000   | 00000 |
| S1 | 00000   | 00000 | 10000   | 01001 |
| S2 | 00010   | 10010 | 10000   | 00000 |
| S3 | 01000   | 01001 | 10000   | 00000 |
| S4 | 00100   | 00100 | 11010   | 10010 |
| S5 | 00001   | 01001 | 11110   | 10010 |
FIG. 6C
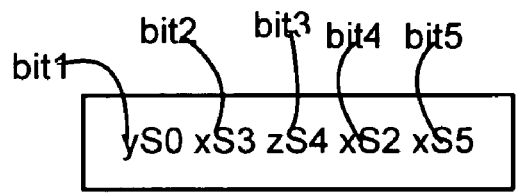
FIG. 6D
|    | DEFINES | KILLS | REACHES | USES  |
|----|---------|-------|---------|-------|
| S0 | 10000   | 10000 | 00000   | 00000 |
| S1 | 00000   | 00000 | 10000   | 01011 |
| S2 | 00010   | 01011 | 10000   | 00000 |
| S3 | 01000   | 01011 | 10000   | 00000 |
| S4 | 00100   | 00100 | 11010   | 10000 |
| S5 | 00001   | 01011 | 11110   | 10000 |

|    | DEFINES | KILLS | REACHES | USES  |
|----|---------|-------|---------|-------|
| S0 | 10000   | 11010 | 00000   | 00000 |
| S1 | 00000   | 00000 | 10000   | 00001 |
| S2 | 00010   | 11010 | 10000   | 00000 |
| S3 | 01000   | 11010 | 10000   | 00000 |
| S4 | 00100   | 00100 | 01010   | 11010 |
| S5 | 00001   | 00001 | 01110   | 11010 |

INFERRING FUNCTION CALLS IN AN AMBIGUOUS LANGUAGE COMPUTER PROGRAM

CROSS-REFERENCE TO COMPUTER PROGRAM LISTING APPENDIX

Appendix A contains the following file in one CD-ROM (of which two identical copies are attached hereto), and is a part of the present disclosure and is incorporated by reference herein in its entirety.

```
Volume in drive D is CAT003
Directory of D:\
04/16/2004 01:25a        48,810      rename.txt
           1 File(s)     48,810 bytes
           0 Dir(s)       0 bytes free
```

The above file contain source code for a computer program written in the C language for one embodiment of the invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Dynamically-typed programming languages (such as the MATLAB® programming language) provide a powerful prototyping and development mechanism for programmers. Because such programming languages allow variables to take on the types of expressions that are assigned to them during program execution, programmers do not have to worry about details such as declaring the variable types or creating functions specific for a given variable type. Such languages support a programming style where programmers create (or in some cases, recreate) variables based on local contexts. Variables are frequently used in several different ways and for several different purposes because programmers basically just create variables as they need them.

While dynamically-typed languages support a relaxed programming style for programmers, they present significant challenges for the programming tools that support them. In particular, the most obvious methods for executing dynamically-typed languages provide extremely slow execution speeds. The result is that programmers cannot develop large applications in a dynamically-typed language because a program of any significant size requires too much time to run. The key to making dynamically-typed languages useful is optimizing their execution performance, increasing their execution speed and thereby decreasing the time required to execute programs of any significant size. The technology behind such execution improvement is commonly called "code optimization", and the tool used to effect those improvements is commonly called a "code optimizer" or just "optimizer".

Optimizers work by "statically" analyzing a program prior to its execution (or its "run-time") to predict how the program will behave when executed on input data. Using those predictions, optimizers change the code that is executed so as to minimize the run time required to perform the calculation. In a very simplistic example, an optimizer will analyze a program that always computes and prints "7*6", and realize that the program will always print "42". In such a case, the optimizer will remove all instructions used in the computation, and leave in only the instructions required to print "42". The effectiveness of an optimizer depends on its ability to predict, prior to program execution, how a program will behave when it executes.

Dynamically-typed languages present a significant challenge for optimizers, since by their very nature dynamically-typed languages hide information until execution time. Since the optimizer has less information prior to execution about how a program behaves when it executes, the optimizer is less able to statically predict program behavior and is thereby limited in its ability to improve program execution.

The most significant hindrance in dynamically-typed languages is the inability to statically distinguish between function calls and array accesses. In many programming languages, function calls are distinguished syntactically by the appearance of parentheses; e.g. a function call in the source is indicated by "function_name (arg1, arg2, . . . )". Parentheses are also commonly used to indicate array accesses (or memory accesses) in languages; e.g. an array access in the source is indicated by "array_name (subscript 1, subscript 2, . . . )" Statically-typed languages are able to easily distinguish between these different uses from variable declarations. The programmer has to provide extra information about the variables to the compilation tool, which allows the tool to determine whether a given usage is an array access or a function call. In dynamically-typed languages, however, where variables can change type during the execution of a single assignment statement, such hints are not readily available. For instance, the variable "x" can be used as a function call in one statement of a program in the form "x(1,1)", then be used as an array access two statements later in the same form: "x(1,1)". Users cannot always easily determine whether a given reference is a function call or array access, making it difficult for them to provide hints to a compilation tool.

A programming reference such as "x(1,1)" above which may be either a function call or a memory access when examined from a strictly syntactic analysis is known as an "ambiguous reference" and the variable associated with that reference ("x" in the example) is known as an "ambiguous name". "Function calls" are variable references that when executed in the interpreter cause the program counter of the computer to jump to a non-sequential location, execute some number of instructions, then jump back to the next sequential instruction (accounting for "branch slots") following the function call. An "array access" is a reference to a variable that represents a collection of elements; the access may either fetch or set the values for some number of that collection. A "scalar access" is a reference to a variable that represents one element, and the access may either fetch or set the value of that element. "Memory access" refers to either an array access or scalar access, particularly when the collective nature of the variable is unknown. If a programming reference is used as a function call along some execution paths and as a memory access along other execution paths, the reference is considered a "dual usage".

The MATLAB® programming language (as defined by the MATLAB interpreter version 13.1) is one example of a dynamically-typed language. It not only supports parentheses as the syntactic notation for both function calls and array accesses, but it also requires that a function that takes no arguments be called without following parentheses. This means that a simple variable access (in MATLAB, such a reference can be either scalar or vector) is ambiguous with function calls. This ambiguity greatly increases the difficulty of building effective programming tools for the language.

The MATLAB programming language is defined by the actions of the interpreter provided for the language by The MathWorks, Inc. Interpreters are useful programming tools for dynamically-typed languages, in that they provide a mechanism naturally suited for resolving typing questions during execution. Interpreters create and maintain an execution state environment (such as a symbol table) while they dynamically execute a program. This environment allows an interpreter at any point during execution to examine the state of the program, including the values and types that have been assigned to variables. This environment allows an interpreter to easily resolve any ambiguity between array accesses and function calls, because it can determine precisely the characteristics of the variable in question. The following paragraph (from "MATLAB: The Language of Technical Computing—Using MATLAB Version 6", The MathWorks, Inc., 2002. p. 16-13) describes how MATLAB resolves variables as it executes:

"When MATLAB comes upon a new name, it resolves it into a specific function by following these steps:

1 Checks to see if the name is a variable.
2 Checks to see if the name is a subfunction, a MATLAB function that resides in the same M-file as the calling function. . . .
3 Checks to see if the name is a private function, a MATLAB function that resides in a private directory accessible only to M-files in the directory immediately above it. . . .
4 Checks to see if the name is a function on the MATLAB search path. MATLAB uses the first file it encounters with the specified name"

Once MATLAB has identified a name as a function rather than as a variable, it resolves the function using the following algorithm ("MATLAB: The Language of Technical Computing—Using MATLAB Version 6", The MathWorks, Inc., 2002. pp. 21-67 and 21-68):

"Function Precedence Order

The function precedence order determines the precedence of one function over another based on the type of function and its location on the MATLAB path. From the perspective of method selection, MATLAB contains two types of functions: those built into MATLAB, and those written as M-files. MATLAB treats these types differently when determining the function precedence order.

MATLAB selects the correct function for a given context by applying the following function precedence rules, in the order given.

For built-in functions:
1) Overloaded Methods
If there is a method in the class directory of the dispatching argument that has the same name as a MATLAB built-in function, then this method is called instead of the built-in function.
2) Nonoverloaded MATLAB Functions
If there is no overloaded method, then the MATLAB built-in function is called. MATLAB built-in functions take precedence over both subfunctions and private functions. Therefore, subfunctions or private functions with the same name as MATLAB built-in functions can never be called.

For nonbuilt-in functions:
1) Subfunctions
Subfunctions take precedence over all other M-file functions and overloaded methods that are on the path and have the same name. Even if the function is called with an argument of type matching that of an overloaded method, MATLAB uses the subfunction and ignores the overloaded method.
2) Private Functions
Private functions are called if there is no subfunction of the same name within the current scope. As with subfunctions, even if the function is called with an argument of type matching that of an overloaded method, MATLAB uses the private function and ignores the overloaded method.
3) Class Constructor Functions
Constructor functions (functions having names that are the same as the @directory, for example @polynom/polynom.m) take precedence over other MATLAB functions. Therefore, if you create an M-file called polynom.m and put it on your path before the constructor @polynom/polynom.m version, MATLAB will always call the constructor version.
4) Overloaded Methods
MATLAB calls an overloaded method if it is not masked by a subfunction or private function.
5) Current Directory
A function in the current working directory is selected before one elsewhere on the path.
6) Elsewhere On Path
Finally, a function anywhere else on the path is selected."

Because the MATLAB interpreter dynamically maintains the program state, it can precisely resolve any ambiguity in the use of a name.

The just-described method for resolving the ambiguous usage of a name in a statement is well-suited for an interpreter, but does not work for a compiler because the compiler must create executable code well before any statements in the program being compiled are executed. Specifically, whether or not a name is defined as a function at the time of execution of a particular statement is unknown ahead of time. Compilers and related tools work by statically predicting the program's execution at run-time. Because they are predicting, and not directly executing, these tools do not have the advantage of a dynamically-maintained execution state.

Resolving the ambiguity, particularly between function calls and array/memory accesses, is an extremely important problem. Since function calls may have widely different effects on a program's state than array accesses, separating them is critical to the success of any program analysis such as optimization. For instance, determining how information flows across procedure calls is an important area of analysis. Such analysis is impossible to perform without knowledge of the procedure calls, which cannot be determined unless procedure calls, memory accesses, and dual usages are separated. This type of information, which is typically used to build a call graph of the procedures and analyze across them, is valuable both to compiler tools and to interpreters that want to pre-optimize program performance before initiating execution. This information may also be useful in contexts other than building a call graph, such as when performing localized procedure inlining.

Because of the significance of the problem, much research has been performed on the problem of statically distinguishing among function calls, array/memory accesses, and dual usage in ambiguous dynamically-typed languages. De Rose and Padua (De Rose, Luiz, and Padua, David, "Techniques for the Translation of MATLAB Programs into Fortran 90", ACM Transactions on Programming Languages and Systems, Vol 21, No. 2, March, 1999. Pages 286-323) developed a state transition diagram to be used with a simple walk over the program representation to distinguish function calls, array accesses, and dual usages. This approach suffers from two deficiencies: a) it does not take advantage of control flow, and b) it does not account for the fact that a dynamically-typed language may have multiple variables that share the same name. The first deficiency will cause the approach to incorrectly label some cases of dual usage. The second deficiency will cause the approach to label as dual usages many variables that are not. In particular, since dynamically-typed languages allow variables to be created and destroyed as values are assigned to them, it is very feasible for a variable to be a function call in the first part of a program and an array access in the later part—in essence, being two completely different variables. De Rose and Padua's technique will force the two variables into one, causing a false dual usage. A compiler transformation "variable renaming" eliminates this false usage when utilized in the embodiment of this invention.

Almasi and Padua developed a different approach based on a data flow analysis framework in a 2002 paper (Almasi, George and Padua, David, "MaJIC: Compiling MATLAB for Speed and Responsiveness", ACM Conference on Programming Language Design and Implementation, June, 2002, Pages 294-303). Their approach is based on a dataflow analysis approach using the fact that "a symbol that has a reaching definition as a variable on all paths leading to it MUST be a variable" (emphasis added). They incorporate this fact into a meet-over-all-paths data analysis framework by defining for each statement a set s of symbols which are known to be variables at that statement. The set s can then be computed for every statement by any number of well-known techniques for computing fixed-point solutions in a lattice. A similar, but different, meet-over-all-paths analysis framework can be set up to determine that set of variables at each statement that are known to be function calls.

Almasi and Padua's approach provides significantly more precision than De Rose and Padua's approach, but still suffers from two significant disadvantages. First, different approaches are required to compute variables and function calls: the computations, while similar, cannot be performed simultaneously on the same data. This means that computing both the variables and the function calls requires roughly twice the amount of some resource (a skilled practitioner will realize that time and memory can be traded off in programmed computers, so that computing both requires roughly either twice the memory or twice the computation time of computing either alone). Since it is necessary to compute both in order to compute "dual usage" variables, this extra overhead is required for most programs. Second, in addition to neither approach (that is, to computing function calls and variable accesses) being able to solve the other problem, neither approach can be applied to other data flow problems, such as dead code elimination, constant propagation, or variable renaming. These transformations are data flow analysis problems that are commonly used by compilers and interpreters to improve program execution. Since they require a different dataflow lattice than that used by Almasi and Padua, an optimizer that attempts both Almasi and Padua's approach and common optimization transformations will incur even more computational overhead.

A problem similar to that of inferring function calls in ambiguous, dynamically-typed languages is the problem of detecting uninitialized variables in statically-typed languages such as FORTRAN. U.S. Pat. No. 5,615,369 granted to Holler on Mar. 25, 1997, which is incorporated by reference, specifies an invention for detecting and initializing uninitialized variables in FORTRAN. Holler's framework computes over all paths whether it is possible for the use of a variable to reach back to the entry of a program without passing through a definition of that variable. If so, the variable may be uninitialized when used, and the invention inserts an initialization at the source. Holler's method provides the same dataflow lattice that is used in more conventional optimization problems, allowing it to be reused for other transformations. However, Holler's approach computes information over all possible control flow paths, causing it to be expensive to compute in some instances.

Dataflow analysis frameworks, lattices, and techniques are well known in the art and are discussed fully in Chapter 4 of a book by Allen, Randy and Kennedy, Ken entitled "Optimizing Compilers for Modern Architectures", Morgan Kaufmann publishers, 2002. This chapter is incorporated by reference herein in its entirety. The goal of dataflow analysis is to relate each "use" of a variable in the program (where "use" means any programming construct that may read or in any other way use the value that the variable contains in the computer's memory) to all possible "definitions" of that variable in the program (where "definition" means any programming construct that may set or change the value that the variable contains in the computer's memory) that can possibly set the value that the use may receive. "Definitions" are also commonly called "defs". A "reference" (or "ref") is any form of reference to a variable, either a use of the variable or a definition of the variable It is well known in the art how to go from a definition of a variable to all locations in a computer program that may use the definition at execution time. Specifically, a "definition-use chain" is a data structure that is commonly used to perform such an operation. A definition-use chain is comprised of nodes and edges, where nodes represent variable references in the user's program, and an edge exists between two nodes when one node is a definition whose value may be used by the second node. In other words, an edge connects a definition to all possible runtime uses of that definition. While edges are normally indicated as going from definition to use, following the flow of data within the program, they may be as easily thought of as flowing from use to def (indicating a use that needs a value defined by the def), and a skilled artisan can easily construct data structures that allow both forms to be used. Note that the term "definition use graph" is more appropriate than the traditional "definition-use chains" because "graph" more correctly characterizes the nature of the information the data structure contains. The definition-use chain (or graph) is essentially a scalar version of true dependences within a program. Note that each node in a definition use graph is also referred to as a "permanent node" if the node represents a permanent definition (e.g. represents a statement or represents a variable) originally present in the user's computer program. In contrast if a node represents a temporary definition that is added automatically (for all variables in most embodiments) then the node is called a "temporary node". As noted below, a temporary node becomes a permanent node in some embodiments during optimization if a variable in the user's computer program was originally undefined.

Constructing definition-use edges within a single straight-line block of code is well known. One visits each statement in order in the basic block, noting the variables defined by each statement as well as the variables used by each statement. For each use, an edge is added to the definition use graph for that use back to the last exposed definition in the block of that variable—in other words, to every definition that reaches the use. Whenever a new definition is encountered for a variable, the new definition kills (i.e. over-writes) the existing definition, so that later uses are linked only to the new definition, not to the old. When the end of the block is reached, the definition use graph is complete.

Constructing a definition-use graph across a program comprised of more than a single straight-line block of code is more complicated. Standard art contains many different methods for computing definition-use graphs for programs containing control flow, many of which are summarized in Chapter 1 by Kennedy, Ken entitled "A survey of data-flow analysis techniques", In a book by S. S. Muchnick and N. D. Jones, editors, "Program Flow Analysis: Theory and Applications,", pp. 1-51. Prentice Hall publishers, 1981. At a high level, the methods all work by decomposing a program into simpler units (basic blocks, intervals, or others) and a control flow graph indicating the flow between the units. In a local pass, information is computed for each individual unit, regardless of the control flow among the units. Such information typically consists of sets of variables that are used, defined, killed ("kills" are definitions where all existing values in a variable can safely be assumed to be replaced), and reaches ("reaches" are definitions that can reach a given use). This local information is then combined into global information by propagating it along the control flow graph, using any of a number of dataflow propagation techniques (including iterative, interval, parse, and others). After the global information is available for the whole program, a definition-use graph can then be constructed by distributing the information back across the local units.

Dataflow information (e.g. in most embodiments definitions and uses) are propagated by several techniques (i.e. iterative, interval, and so on) are based on framing the problem inside a lattice(also referred to in this patent application as a dataflow framework). A lattice, as defined in S. Muchnick, Advanced Compiler Design and Implementation, Morgan Kaufmann, 1997, consists of a set of values and two operations "meet" and "join", both of which are closed, commutative, associative, distributive (in this patent application, but not in general), and monotonic (again in this patent application, but not in general). A lattice also has two designated elements "top" and "bottom". All the dataflow propagation techniques discussed at the beginning of this paragraph can be applied to any problem that can be embedded in such a lattice (or dataflow framework). Propagating uses and definitions of variables is certainly one type of information embedded in a lattice in all embodiments of the invention.

When definitions and uses are propagated through a lattice, it is often convenient to abstract the resulting flow of data in a definition-use graph. Definition-use graphs can be embodied in a number of different forms, including linked lists, bit matrices, sets, bit vectors, etc. While the description of the techniques most often refers to a linked list of edges, skilled practitioners will readily recognize that all representations are equivalent in terms of the application of this invention.

One of the reasons that the ability to distinguish function calls from memory accesses is critical to optimizing programs written in a dynamically-typed language is that an understanding of function calls is critical to constructing definition-use graphs and optimizing transformations. A memory access that is only a use (a fact that can be determined from a syntactic analysis of the program in most languages that are not dynamically-typed) is guaranteed not to change the state of memory (other than registers) in a programmed computer. A memory access that is a definition (a fact that can again be determined from a syntactic analysis of the program in most languages that are not dynamically-typed) is guaranteed to change only a limited number of elements of memory of a programmed computer. A function call, however, can execute an arbitrary number of instructions, which may fetch and set any number of elements of a computer's memory. Since the goal of optimization is to predict at compile time what a program is going to do at run time, function calls are a large source of unpredictability, and thus are difficult for optimization techniques to handle. Memory accesses, on the other hand, have a limited set of effects, and are much more easily handled. As a result, separating function calls from memory accesses is critical to effectively optimizing a program, and in particular to constructing an accurate definition-use graph for a program.

"Entry points" and "entry nodes" are well defined terms in compiler literature. An entry point is a program location by which control may enter a function. In many programming languages, that is a single statement, such as in MATLAB, where the function header is the only entry point. In other languages, such as FORTRAN, multiple entry points into a procedure are supported, and any of those serves as an entry point. For analysis, compilers often simplify programs with multiple entry points by creating one unique entry point and by making the multiple entry points labels. When control reaches the unique entry point, it immediately branches to the appropriate label representing the former entry point to which control was to transfer. An "entry node" is the intermediate representation of the unique entry point.

SUMMARY

Several embodiments of the invention at least partially resolve an ambiguous usage of a name (also called an "ambiguous name" or "ambiguous reference") in a statement (also called "ambiguous statement") of a computer program, by automatically adding to an entry statement thereof a definition that includes the ambiguously used name (the added definition is also called "temporary definition"), followed by constructing a definition-use graph, followed by checking whether or not an edge from the temporary definition reaches the statement containing the ambiguously used name.

If all edges into the ambiguous statement are from the temporary definition, then the name is deemed to be a function call. If all edges into the ambiguous statement are not from the temporary definition, then the name is deemed to be a memory access. If some edges into the ambiguous statement are from the temporary definition but other edges into the ambiguous statement are not from the temporary definition, then the name is deemed to be a dual usage (or an undefined usage) by the programmer.

If all ambiguities in a computer program are resolved (to be either a function call or a memory access), then the program is thereafter compiled, in the normal manner. If any ambiguity remains unresolved (i.e. is neither a function call nor a memory access), then the statement is flagged, so that the programmer may take an appropriate action. For example, in such a case, the programmer may eliminate a dual usage by changing the name into a unique name, if the program is to be compiled. Alternatively, the programmer may maintain the dual usage, but not compile the program and instead use the interpreter so that the ambiguity in such dual usage is resolved at run time in the manner described above in the Background section.

BRIEF DESCRIPTION OF THE FIGURES

FIGS. 6A-6F illustrate, in high level block diagrams, data structures contained in a computer's memory in some embodiments during the performance of the acts illustrated in FIG. 5.

DETAILED DESCRIPTION

Figure 1:
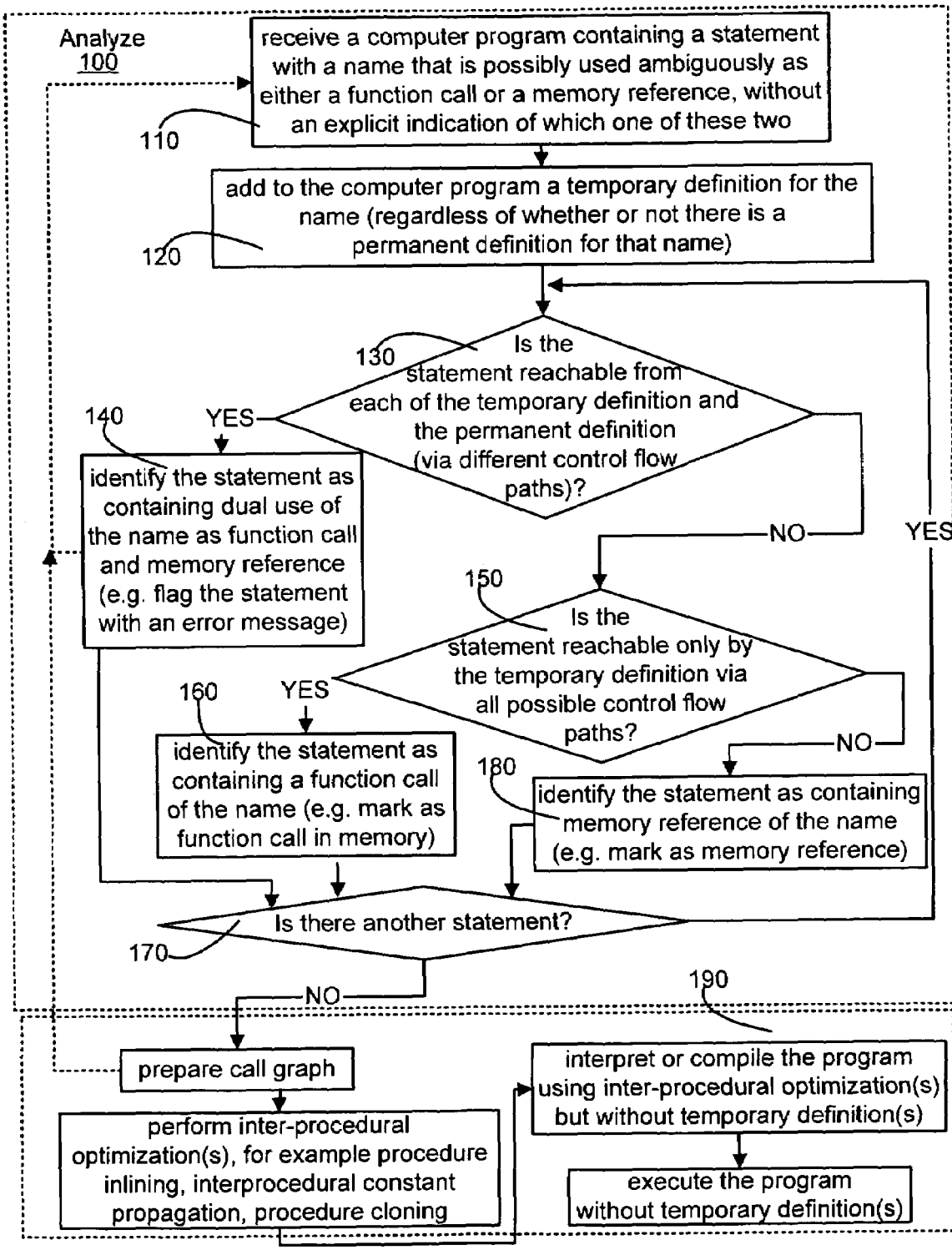
FIG. 1 illustrates, in a flow chart, acts performed by some embodiments of the invention for resolving an ambiguous reference as a function call, memory access, or dual usage, and for using that information to analyze a program interprocedurally in order to improve its execution.

In several embodiments of the invention, a computer is programmed to at least partially resolve an ambiguous usage of a name in a statement of a computer program, by adding to an entry statement (or in a statement immediately following the entry statement) a definition (also called "temporary definition") that includes the ambiguously used name, followed by constructing a definition-use graph of the computer program, followed by checking whether or not an edge in the graph from the added definition reaches the statement (also called "ambiguous statement") containing the ambiguously used name.

In some embodiments, this invention enables a programmed computer to read in a user's computer program written in a dynamically-typed language that contains syntactic ambiguity between function calls and memory accesses. The programmed computer is able to resolve the ambiguity and classify ambiguous references as either function calls, variable accesses, or a dual usage (that is, the variable may have different types depending on which execution path is followed). One embodiment of this invention is precise to the limits of symbolic execution, providing a significant advantage over the prior art by De Rose and Padua discussed in the Background section (above).

One embodiment of the invention is accomplished using just one data flow analysis framework, which is also the same framework used for other optimization transformations (such as constant propagation, dead code elimination, variable renaming, and such For these reasons, this embodiment permits significant computational advantages over the prior art by Almasi and Padua discussed in the Background section (above). Note that this embodiment employs definitions temporarily to simplify computational structure and reduce computational expense, and solves the problem of resolving ambiguous references (as opposed to detecting and correcting uninitialized variables). In this embodiment, "temporary" definitions are automatically inserted prior to or as part of the dataflow construction, as a technique of simplifying the dataflow propagation through the lattice (e.g. by iterative or interval technique) and resulting analysis. The definitions being automatically inserted are temporary because all (or almost all) definitions are automatically removed prior to any form of optimization or code generation, although in other embodiments, such automatically inserted definitions may be retained in the code and removed at a later time. In contrast, note that Holler's definitions are automatically inserted to be retained permanently, after dataflow construction and analysis, so as to correct for uninitialized variables that have been detected. Holler's automatically inserted definitions do not enter into the dataflow propagation. They are instead inserted after further processing the results of dataflow propagation (i.e. after dataflow propagation (also called "dataflow analysis") has been completed).

Several embodiments are focused on automatically identifying function calls, memory accesses, and dual usages in ambiguous dynamically-typed languages. In contrast, Holler's techniques appear to be focused on detecting and correcting uninitialized local variables in statically-typed languages such as FORTRAN. Despite this different focus, it may be worthwhile to see how an embodiment of this invention is applied to detection and correction of uninitialized local variables in FORTRAN. Hollers approach appears to involve: a) construct def-use web, b) for each use, see if there is an exposed execution path (this step does not appear to use the def-use web) from the variable to an entry point, c) if not, the variable is always identified as being initialized, d) if some paths are exposed but not all, the variable is identified as being possibly uninitialized and a definition is inserted at the entry, and e) if all paths are exposed, the variable is identified as being definitely uninitialized and a definition is inserted at the entry. An "exposed execution path" as used by Holler means a path from the entry node to the use of a variable such that the variable is not defined anywhere along the path. Holler does not appear to specify how such paths are uncovered. As noted above, the definitions being inserted by Holler are retained permanently (and are to be used by Holler during subsequent steps, such as code generation), because the inserted definitions correct for uninitialized variables. In contrast, one embodiment of this invention performs the following acts (in the order of description): a) insert temporary definitions for all local variables at each entry point without any checking (i.e. definitions are automatically inserted regardless of whether or not there is an exposed execution path), b) construct a definition-use graph including the temporary definitions, c) for each temporary definition, see if it reaches any use, d) if the temporary definition reaches no use, the variable is not uninitialized, (note that the definition is eventually removed (e.g. by use of a classic optimization called "dead code elimination" as described in Allen and Kennedy, chapter 4, to do this automatically), e) if the temporary definition reaches a use, and no permanent definitions reach that use, the variable is always identified as being uninitialized, and f) if the temporary definition reaches a use and permanent definitions also reach that use, the variable is identified as being possibly uninitialized. These last steps (d), (e) and (f) are effected in most embodiments of the invention by a simple loop over the edges in the definition-use graph, rather than by tracing execution through possible control flows. As a result, this embodiment is far more effective computationally in solving Holler's problem. In addition, note that this embodiment eliminates the need to explicitly look for and find exposed execution paths as done by Holler. Furthermore, if no warning messages need be issued, then dead code elimination automatically retains any automatically inserted definitions that are deemed to be necessary (at which point they become permanent definitions), and deletes the automatically inserted definitions that are unnecessary.

Temporary definitions are known to have been used in the prior art at the beginnings of DO loops in vectorizing and parallelizing compilers in order to detect scalar references that may be expanded on vector machines or privatized on parallel machines, as described in Chapters 5 and 6 of Allen and Kennedy and in Chapter 6 of Pieper (Pieper, Karen. "Parallelizing compilers: Implementation and effectiveness." PhD. thesis, Stanford Computer Systems Laboratory, June, 1993.). However, this prior art usage of temporary definitions does not disclose or suggest their usage in various embodiments of the invention, as described herein.

Many embodiments of this invention insert temporary definitions at critical points in the program flow. Different embodiments use different methods to determine how those assignments are inserted. For instance, Static Single Assignment (also called SSA) is an intermediate representation that uses program flow to insert definitions at critical join points (Allen and Kennedy, Chapter 4). Use of SSA to insert temporary definitions for use in resolving ambiguous references is one embodiment of this invention.

Some embodiments of the invention construct a definition-use graph that allows for function calls and memory accesses to be determined without prior knowledge of which references are function calls and which are memory accesses. This knowledge is normally required to construct definition-use graphs. Holler's technique, for instance, could not be applied to this problem, because her construction of definition-use graphs requires knowledge of function calls (something that is syntactically obvious in FORTRAN), which is not available in a dynamically-typed language.

Because embodiments of this invention formulate the resolution of ambiguous references in a dataflow lattice used for other conventional optimization problems, they are able to directly apply other optimization transformations to dynamically-typed languages. For instance, variable renaming (also called scalar renaming) is a transformation used by vectorizing compilers to reduce the complexity of a dependence graph (Allen and Kennedy, Chapter 5.4). To the applicant's knowledge, this transformation has never been employed to reduce the number of dual usage references that a dynamically-typed program may contain. Embodiments that employ this transformation utilize the transformation in a novel way and for a novel purpose. Furthermore, this transformation is simpler to implement in embodiments of this invention than in other approaches, because embodiments of this invention are based on the same dataflow framework used for variable renaming. Other approaches use a different framework which is not compatible.

FIG. 1 illustrates, in a high level flow chart, the overall process in some embodiments. A user may prepare a program which contains a name (also called "ambiguous name") which cannot be syntactically determined to be a function call or memory access. "Memory access" includes both "scalar access" (that is, access to variables that abstractly represent a single entity) and "array access" (that is, access to variables that abstractly represent a collection of entities; the reference may be to either one or multiple of those entities). Said program is received in some embodiments of this invention in act 110 and is converted to a representation that is amenable to analysis.

After receiving said program, some embodiments of the invention insert a "temporary definition" of the ambiguous name to the program in act 120. This temporary definition does not permanently change the user's computer program; the definition is strictly temporary, and is present only to enable the analysis. It does not appear in any executable code. This is distinctly different from Holler's approach, where such inserted definitions are permanent and appear in the executable code.

Figure 2A:
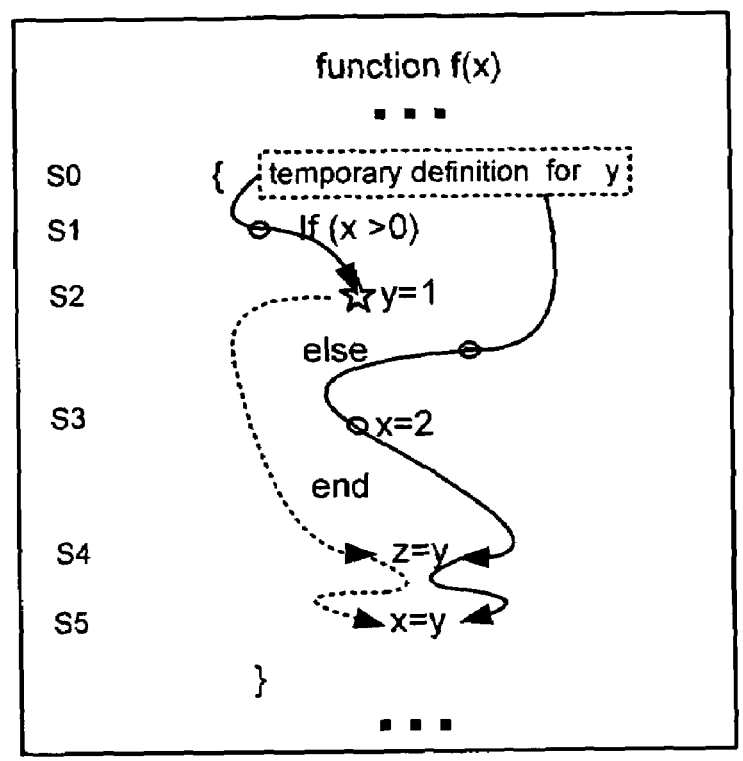
FIGS. 2A and 2B illustrate, in a high level block diagram, the flow of data through a user's source program and corresponding intermediate representation in a computer's memory for an ambiguous reference that resolves into a dual usage.

FIGS. 2A, 2B, 3A, 3B, 4A, and 4B illustrate the program after the temporary definition has been inserted for ambiguous names that are resolved into dual usages, function calls, and memory access, respectively. In FIG. 2A, a temporary definition (S0) has been inserted for variable "y" into the user's program. Variable "y" is ambiguously used in both statements S4 and S5. The temporary definition S0 can reach the ambiguous statements S4 and S5 through one execution path in the program (visualized by the solid arrows, proceeding through statements S1 and S3). On an alternative execution path, the temporary definition is blocked from reaching the ambiguous statements. When following the execution path {S0, S1, S2, S4}, the temporary definition does not reach past statement S2, because S2 defines a new value of "y"—a "permanent definition"—which reaches S4 following the execution path indicated by the dotted arrow. Since both the permanent definition S2 and the temporary definition S0 reach the ambiguous statements S4 and S5, the use of "y" in S4 and S5 is a dual usage. The reference is a memory access when the dotted control path is followed and is a function call when the solid control path is followed.

Figure 2B:
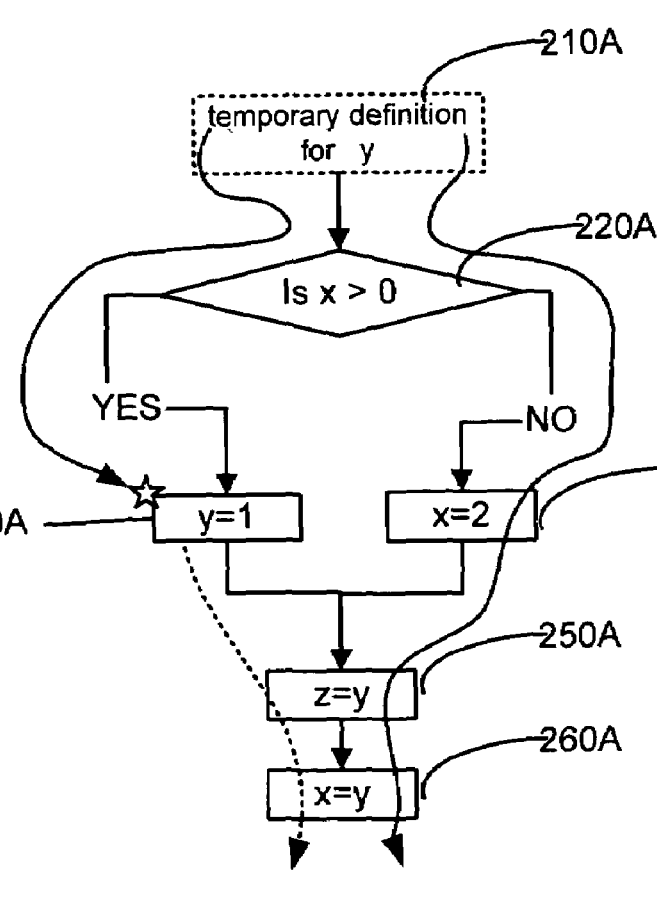

FIG. 2B illustrates the performance of the same steps, but on an intermediate program representation such as that used by a compiler or an interpreter. The temporary definition 210A is inserted for the ambiguous name "y". This temporary definition can reach the ambiguous statements 250A and 260A following the execution path indicated by the solid arrow (220A, 230A, 250A). On another execution path {220A, 240A, 250A), the temporary definition does not reach the ambiguous statements; instead the permanent definition 240A blocks the temporary definition, and the permanent definition reaches the ambiguous statement following the dotted arrow. The reference is a memory access when the dotted control path is followed and is a function call when the solid control path is followed.

Figure 3A:
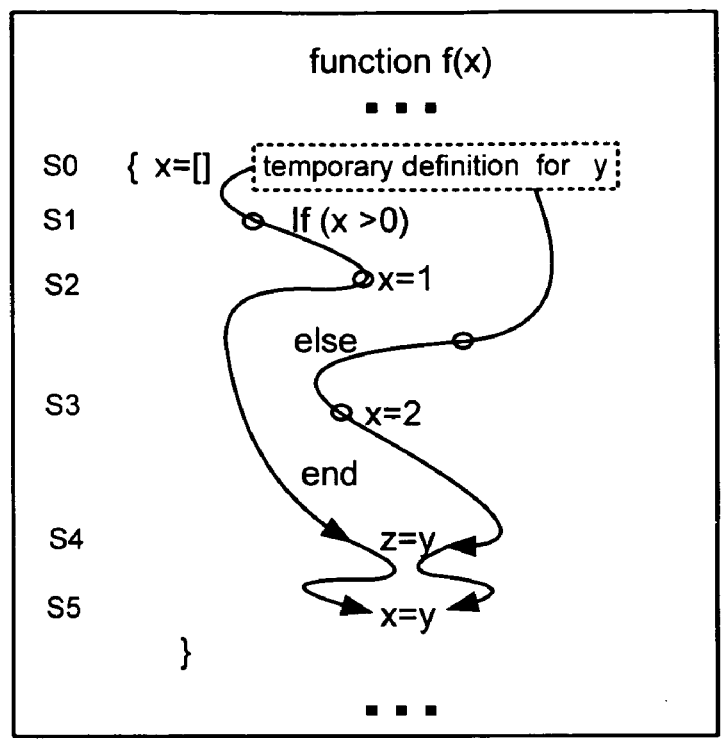
FIGS. 3A and 3B illustrate, in a high level block diagram, the flow of data through a user's source program and corresponding intermediate representation in a computer's memory for an ambiguous reference that resolves into a function call.
Figure 3B:
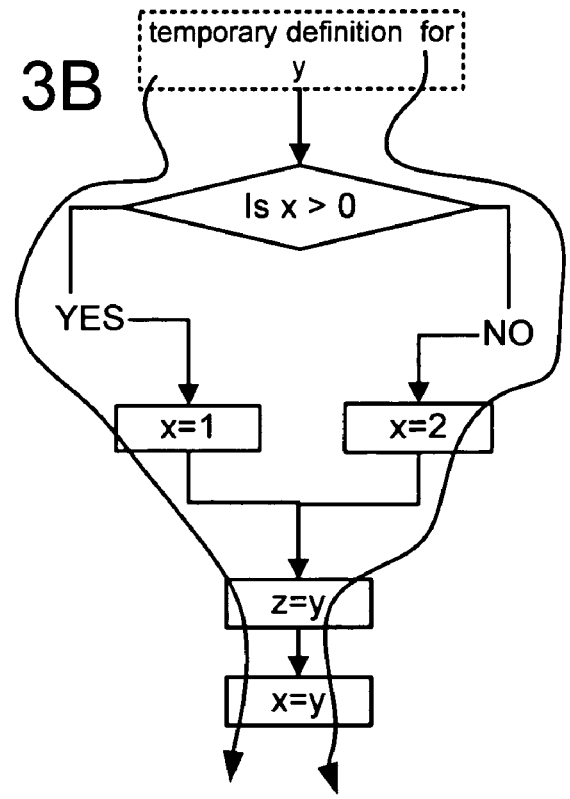

FIGS. 3A and 3B illustrate the performance of the same steps when the ambiguous name resolves to a function call. In FIG. 3A, the temporary definition S0 for "y" is again inserted in the user's source program. This temporary definition reaches the ambiguous statements S4 and S5 along all execution paths (indicated by the solid arrows), so that the ambiguous names can be determined to be function calls. FIG. 3B repeats the same steps on an intermediate representation used by a compiler or interpreter.

Figure 4A:
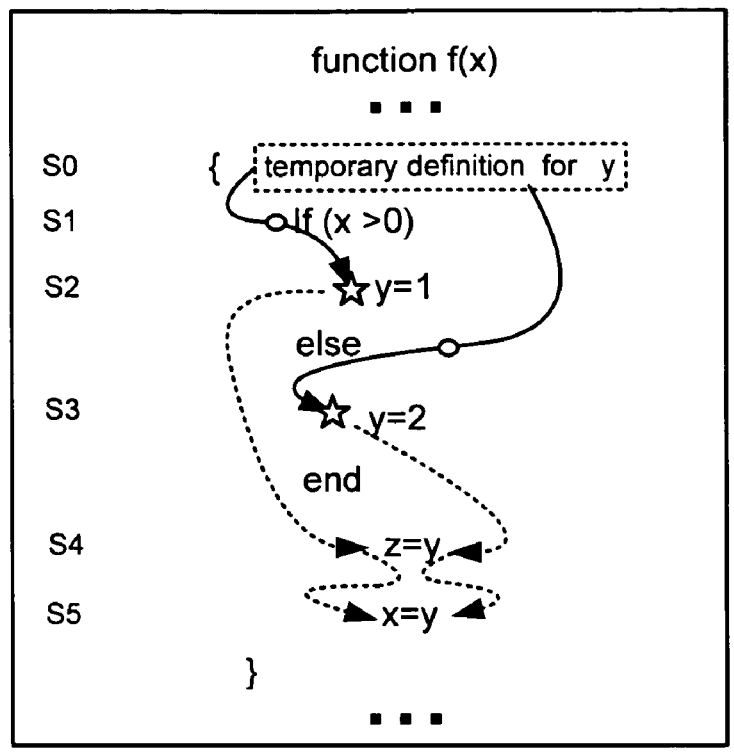
FIGS. 4A and 4B illustrate, in a high level block diagram, the flow of data through a user's source program and corresponding intermediate representation in a computer's memory for an ambiguous reference that resolves into a memory access.
Figure 4B:
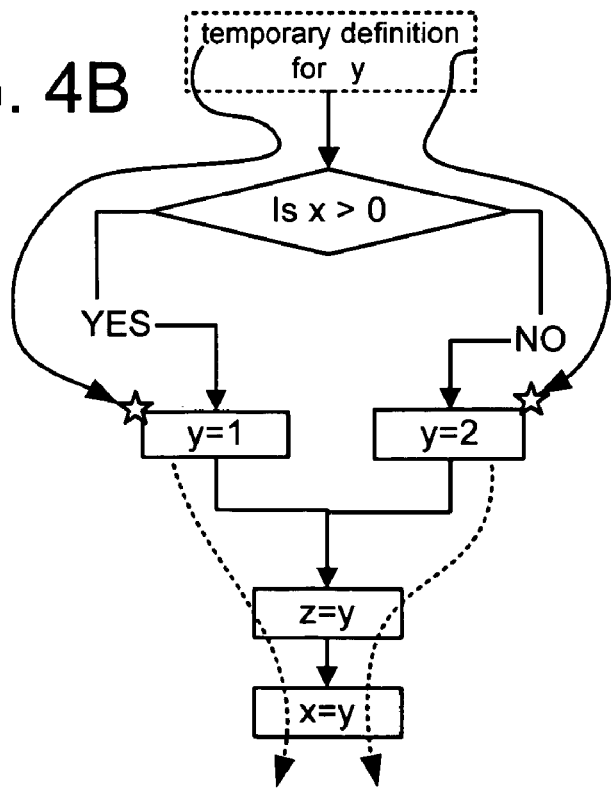

FIGS. 4A and 4B illustrate the performance of the same steps when the ambiguous name resolves to a memory access. In FIG. 4A, the temporary definition S0 for "y" is again inserted in the user's source program. This temporary definition is unable to reach either of the ambiguous statements S4 and S5 along any execution path, because permanent definitions block it along any path. Since only permanent definitions reach the ambiguous statements (along the dotted arrows), the ambiguous names can be determined to be memory accesses. FIG. 4B illustrates the same steps on an intermediate representation used by a compiler or interpreter.

Returning to FIG. 1, after inserting the temporary definition in act 120, embodiments of the invention then determine in act 130 whether the ambiguous use is reached by both a temporary definition and a permanent definition in order to distinguish among the cases illustrated in FIGS. 2A, 2B, 3A, 3B, 4A, or 4B. If the answer is yes, then the ambiguous use is a dual usage as illustrated in FIGS. 2A and 2B and is flagged as such in act 140. Some embodiments cannot handle dual usages, and will issue an error message at that point. Alternative embodiments only mark the usage as a dual usage, and continue processing other statements in the user program by proceeding to act 170.

If the answer in act 130 is "no" (that is, the statement is not reached by both temporary and permanent definitions), embodiments then test in act 150 whether the ambiguous statement is reachable only by temporary definitions. If "yes", then the ambiguous use is marked as a function call in act 160 (this is the usage illustrated in FIGS. 3A and 3B) and more ambiguous statements are processed in act 170. If the answer to act 150 is "no", the ambiguous use is marked as a memory access in act 180 (this is the usage illustrated in FIGS. 4A and 4B), and a check is made for more ambiguous statements in act 170.

Once all ambiguous statements have been processed, so that the answer to the test in act 170 is "no", different embodiments exploit the information used in different ways. For instance, the embodiment illustrated in FIG. 1 proceeds to improve the execution characteristics of the user's program by executing the acts encapsulated in box 190, using the information gathered about function calls to build a call graph in order to perform interprocedural analysis. It then uses the results of that analysis to improve the execution characteristics of the user's program. Final execution of the user's program in this embodiment is through either a compiler or an interpreter. While performing act 190, this embodiment optionally goes back to act 110 to compute information about other functions and add that information to the call graph. Alternative embodiments skip the calculation of the call graph and go directly to more limited interprocedural optimizations and analysis. An alternative embodiment performs interprocedural optimizations such as procedure inlining or procedure cloning without first building a call graph. Other embodiments go directly to code generation or execution without performing any interprocedural analysis. Other embodiments indicate that the program is not compilable if it contains any variables that are dual usage, and indicate the dual usage references with error messages. These, and all other embodiments of this invention, have one common feature: all temporary definitions are either removed from the program before code is generated or are ignored during the code generation process. The temporary definitions are useful in performing the analysis and are removed or ignored once the analysis is completed.

Figure 5:
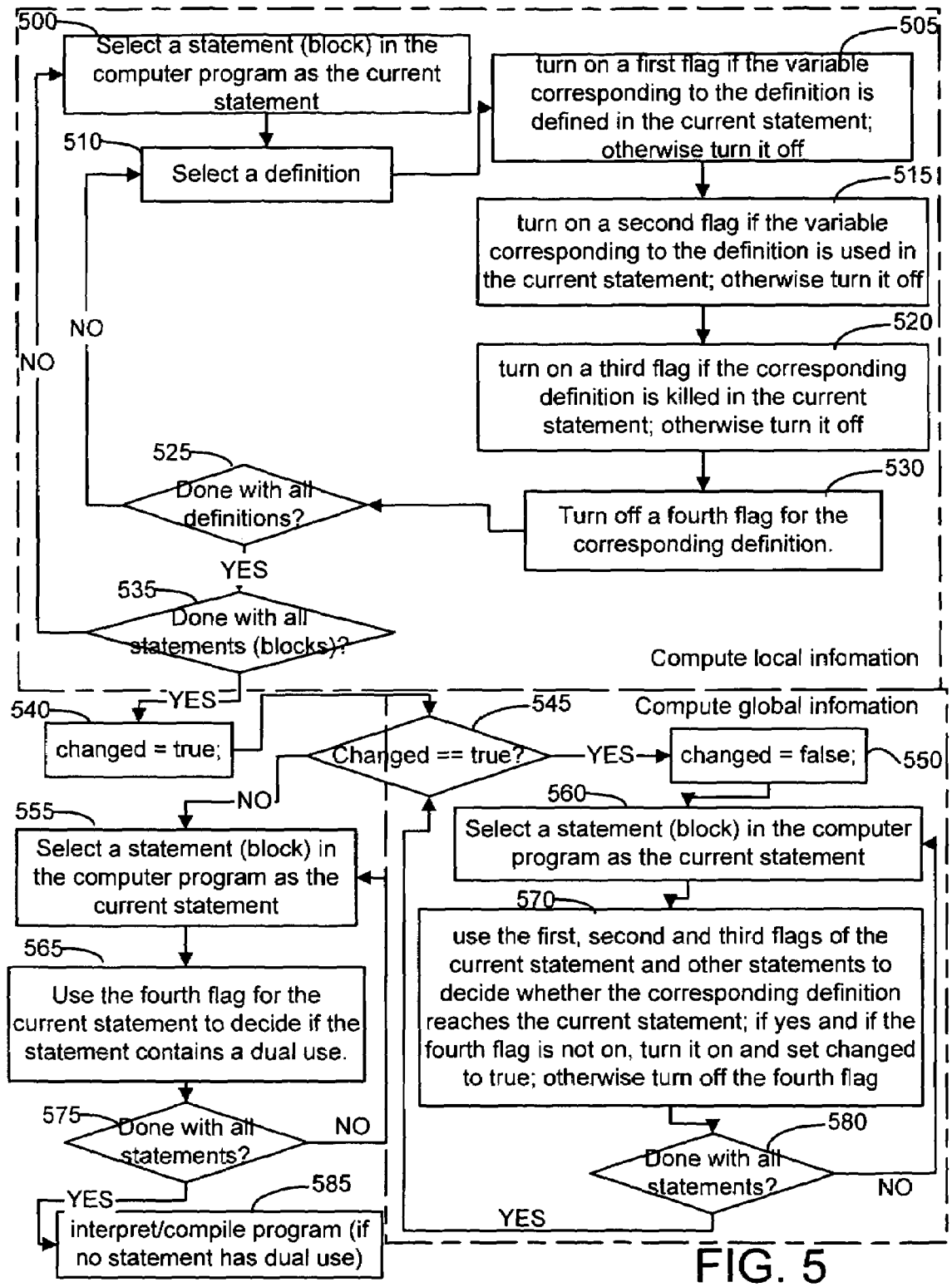
FIG. 5 illustrates, in a flow chart, acts performed by some embodiments of the invention in using reaching bits to determine function calls, memory accesses, and dual usages.
Figures 6E, 6F:
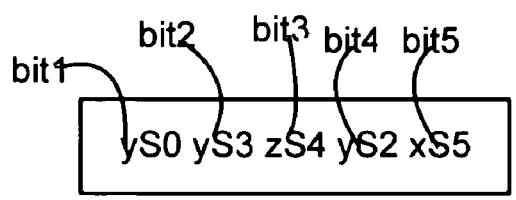

The test in act 130 of FIG. 1 is answered by different methods in different embodiments. Some embodiments use standard data flow analysis techniques to construct definition-use graphs, reachability sets, or other data structures. Other embodiments use different methods such as tracing execution paths or control flow to answer the question. FIG. 5 presents one embodiment which works by constructing reachability sets. In this embodiment, sets are represented as bit vectors. Sets can be represented by many different data structures, and a skilled artisan can easily extend the techniques described in this embodiment to other set representations. The method illustrated in FIG. 5 computes four sets (illustrated in FIGS. 6B, 6D, and 6F) for each statement or basic block in the user's program, named DEFINES, KILLS, REACHES, and USES for the convenience of illustration. Each element in the set (or each bit in the bit vector) represents one "definition" in the program, as illustrated in FIGS. 6A, 6C, and 6E. A "definition" is a variable in conjunction with a statement that defines a value for that variable. For instance, in FIG. 6A there are two definitions for the variable "y". The first element of the vector represents the temporary definition of "y" in statement S0; the fourth element of the vector represents the definition of "y" in statement S2.

Some embodiments compute the four sets by the method illustrated in the high level flow chart in FIG. 5. At a high level, the computation breaks down into two general passes. Three of the sets are computed using only local information (that is, information derived directly from the statement or block) as indicated in the upper dotted box. The fourth set is derived by globally propagating the local information across the entire program, as indicated in the lower dotted box. The result is a set for every block or statement that indicates which definitions reach the block or statement. The fact that temporary definitions reach a given use can be derived from this set, and thus used to identify function calls, memory accesses, and dual usages.

The embodiment illustrated in FIG. 5 starts by computing local information for all the statements or blocks. Act 500 selects a block (or statement; hereinafter "block" will be used to indicate either a basic block or a statement) for which local information is to be computed. After selecting a block, the programmed computer then proceeds to act 510, where it selects a definition to process for that block. It then enters the effects of that definition on the local sets in acts 505, 515, and 520. Act 505 builds the DEFINES set; if the variable defined by selected definition is also defined in the current block, that definition is added to the set (indicated with bit vectors by enabling the corresponding bit). If the variable defined by the definition is not defined in the current block, the definition is not added to the set (indicated with bit vectors by clearing the corresponding bit). Act 515 builds the USES set; if the variable defined by the selected definition is used in the current block, that definition is added to the set (indicated with bit vectors by enabling the corresponding bit). If the variable defined by the definition is not used in the current block, the definition is not added to the set (indicated with bit vectors by clearing the corresponding bit). Act 520 builds the KILLS set. If the selected definition cannot reach beyond the current block because the block defines a value that totally overwrites the definition (a situation called "killing" the value), the definition is added to the set (again by enabling the corresponding bit in the bit vector). If not, the definition is not added to the set (indicated by clearing the corresponding bit). The selected definition is removed from a fourth set (REACHES) by act 530. This set will be computed in the global pass using the first three sets. Act 525 moves through the next definition and proceeds back to act 510 until all definitions have been processed. Act 535 moves through the next block and proceeds back to act 500 until all blocks have been processed, thereby completing the computation of local information.

Once local information has been computed, the programmed computer proceeds to compute global information by setting a flag "changed" to true in act 540. In this embodiment, the programmed computer calculates the global information by repeatedly propagating information through the control flow graph until no changes occur during propagation (that is, a fixed point is reached). The flag "changed" is used to drive that iteration. After setting "changed" to true, the programmed computer enters a loop at act 545 that tests whether "changed" is true. If it is true (which it will be on the first iteration given act 540), the loop is entered and "changed" is initialized to false in act 550. A block (or statement) is selected in act 560; that block is used in act 570 to update values for the four sets by propagating information from block to block. Different embodiments use different methods for updating these values. One specific embodiment updates this information for a block "b" using the equation: "REACHES(b)=REACHES(b)|(DEFINES(p)| (REACHES(p) & ~KILLS(p)))" where "p" is iterated over all predecessors of "b" in the control flow graph. Whenever REACHES(b) changes for a given block "b", the flag "changed" is set to true. After that, the programmed computer checks in act 580 whether all statements have been processed. If not, it selects another statement to process in act 560 and continues iterating. If yes, one iteration of propagation has been completed, and the programmed computer proceeds to act 545 to test whether global information has been completely computed. If not, it performs another round of propagation via act 550. Otherwise, it executes act 555 to make use of the global information to separate function calls, memory accesses, and dual usage.

In act 555, the programmed computer selects a statement to analyze for function calls, memory accesses, and dual usages. Once selected, the programmed computer executes act 565 to use at least the fourth flag to determine whether the statement contains a dual usage. Different embodiments take different approaches to determining this. One exemplary embodiment intersects the REACHES set for the current statement with the USES set for that statement. If the resulting set contains members for a variable that are all temporary definitions, that variable is used as a function call in the statement. If the resulting set contains members for a variable that are all permanent definitions, the variable is used as a memory access. If the resulting set contains both elements that are permanent definitions and elements that are temporary definitions for a variable, that variable is a dual usage.

After setting the type of usage, the programmed computer executes act 575 to determine whether all statements have been examined. If not, it proceeds to act 555 and repeats the process. If so, the computer proceeds via act 585 to continue the optimization, compilation, interpretation, or other acts starting after act 170 from FIG. 1.

FIGS. 6A-6F illustrate the sets computed by one embodiment of the invention. FIGS. 6A and 6B illustrate the final sets after global information is computed for the example program illustrated in FIGS. 2A and 2B. FIG. 6A illustrates which position in the bit vector corresponds to which definition. For instance, the leftmost element of the bit vector corresponds to the definition of variable "y" in statement S0; the next bit corresponds to the definition of "x" in statement S3; and so on. Since statement S0 has been temporarily inserted to hold the temporary definitions, any definition that emanates from S0 is a temporary definition, and all other definitions are permanent definitions. Thus, the leftmost bit of the four bit vectors (corresponding to the definition of "y" in S0) represents a temporary definition; all other bits represent permanent definitions.

FIG. 6B illustrates the bit vectors at the end of the global computation. Since S0 holds the temporary definitions, the DEFINES vector for it has all bits corresponding to temporary definitions enabled (i.e. the left most bit). Since that temporary definition is for "y", the statement will kill all definitions involving the variable "y". The KILLS vector indicates this by having bits 1 and 4 (counting from the left) enabled, corresponding to the temporary definition of "y" in S0 and the permanent definition of "y" in S2. No other statements in the program reach S0, so its REACHES vector is all zeros, and it holds only temporary definitions that take no inputs, so its USES vector is likewise all zeros. Since statement S1 is an "IF" test, it neither defines nor kills any variables, indicated by zero DEFINES and KILLS vectors. The definition of "y" in S0 can obviously reach the statement (indicated by the leftmost bit of REACHES enabled), and since S1 tests the input value of "x", it can use any definition of "x" that reaches the statement. This includes the uses in S3 and S5 (indicated by the corresponding bits in the USES vector) if they can reach the statement; the REACHES vector has shown that they cannot. S2 is an assignment of "1" to "y", thereby comprising a permanent definition. Since it corresponds to the fourth definition, the fourth bit from the left is enabled in DEFINES. Since it kills all values of "y" that reach it, bits for the definitions of "y" in S0 and S2 are enabled in the KILLS vector. The only definition that reaches it is the temporary definition of "y", and since the values used are constants, no definitions are used by the statement. S3 is an assignment of "2" to "x". It is the source of the second definition, which explains the bits in the DEFINES and KILLS vectors. The only definition which can reach it is the temporary definition, and it uses no variables.

S4 and S5 are the ambiguous statements in this program. Since S4 defines "z" and S5 defines "x", their KILLS and DEFINES vectors are similar, varying only in the different variables defined and in the fact that there are two definitions for "x" in the program but only one for "z". Both statements use "y", so the USES vector is identical for each. The REACHES vector for S4 indicates that the definitions for "y" in S0 (temporary), "x" in S3 (permanent), and "y" in S2 (permanent) reach it. The REACHES vector for S5 is similar, containing the extra definition of "z" in S4 (which cannot reach itself). The REACHES vector for S4 indicates that the temporary definition of "y" from S0 can reach statement S4 (by following the solid execution through S3), the permanent definition of "y" from S2 can reach statement S4 (by following the dotted execution path), and the permanent definition of "x" in S3 can reach statement S4 (following the solid execution path). Because the embodiment presented in FIG. 5 utilizes an arbitrary selection step, it is impossible to precisely demonstrate the steps in which these four vectors are developed. However, since the embodiment iterates to a fixed point, the final result is the same regardless of how it gets there.

The fourth bit vector (REACHES) is used in act 565 of FIG. 5 to determine whether the use of "y" in statement S4 is a function call, memory access, or a dual usage. Since S4 uses both the first and the fourth definition (counting from the left), and since the first definition is a temporary definition for "y" and the fourth definition is a permanent definition for "y", the programmed computer would determine that the usage is a dual usage.

FIGS. 6C and 6D illustrate the same embodiment applied to the input program illustrated in FIGS. 3A and 3B. In FIG. 3A, the permanent definition of "y" in S2 (in FIG. 2A) that killed the temporary definition has been converted to a definition of "x". This causes an extra use to appear in USES for S1 (since S1 uses "x" and a new definition has been created for "x", a new member is added to USES) and a new set of KILLS and DEFINES to occur for S2 (since it now defines "x" rather than "y"). The computation steps are the same, and given that the new definition was substituted directly in place of the old definition in the bit vector, the REACHES vector for the ambiguous statements S4 and S5 is the same. However, since the fourth definition (that in S2) is now for "x" rather than "y", S4 and S5 no longer use it. This removes one entry from the USES vector. As a result, S4 and S5 now only use the leftmost definition, which is the temporary definition. As a result, all reaching definitions are temporary, and the use is determined to be a function call.

FIGS. 6E and 6F illustrate the same embodiment applied to the input program illustrated in FIGS. 4A and 4B. The program in FIGS. 4A and 4B differs from the one in FIGS. 2A and 2B only in that the assignment in S3 has been converted into a definition of "y", rather than a definition of "x". This causes changes to the DEFINES and KILLS sets for statement S3. The computed REACHES sets for the ambiguous statements S4 and S5 show that definitions 2 and 4 reach the statement, but the leftmost temporary definition does not. This is because the value of the temporary definition is blocked or killed along every control path from S0 to S4 and S5. Since definitions 2 and 4 are both permanent definitions, all reaching definitions are permanent, and the use is determined to be a memory access.

Figure 7A:
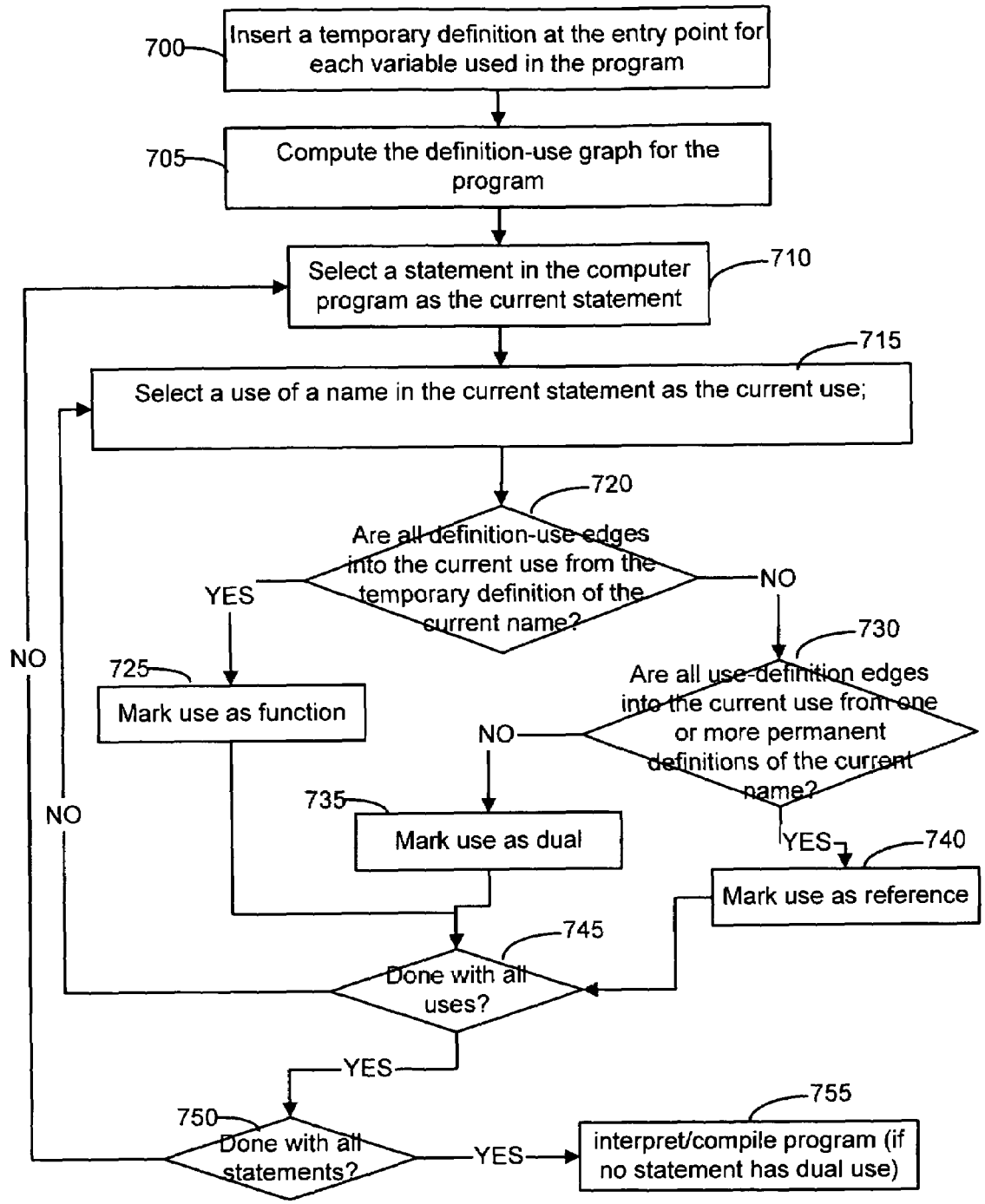
FIGS. 7A and 7B illustrate, in a flow chart, acts performed by some embodiments of the invention in detecting function calls, memory accesses, and dual usages
Figure 7B:
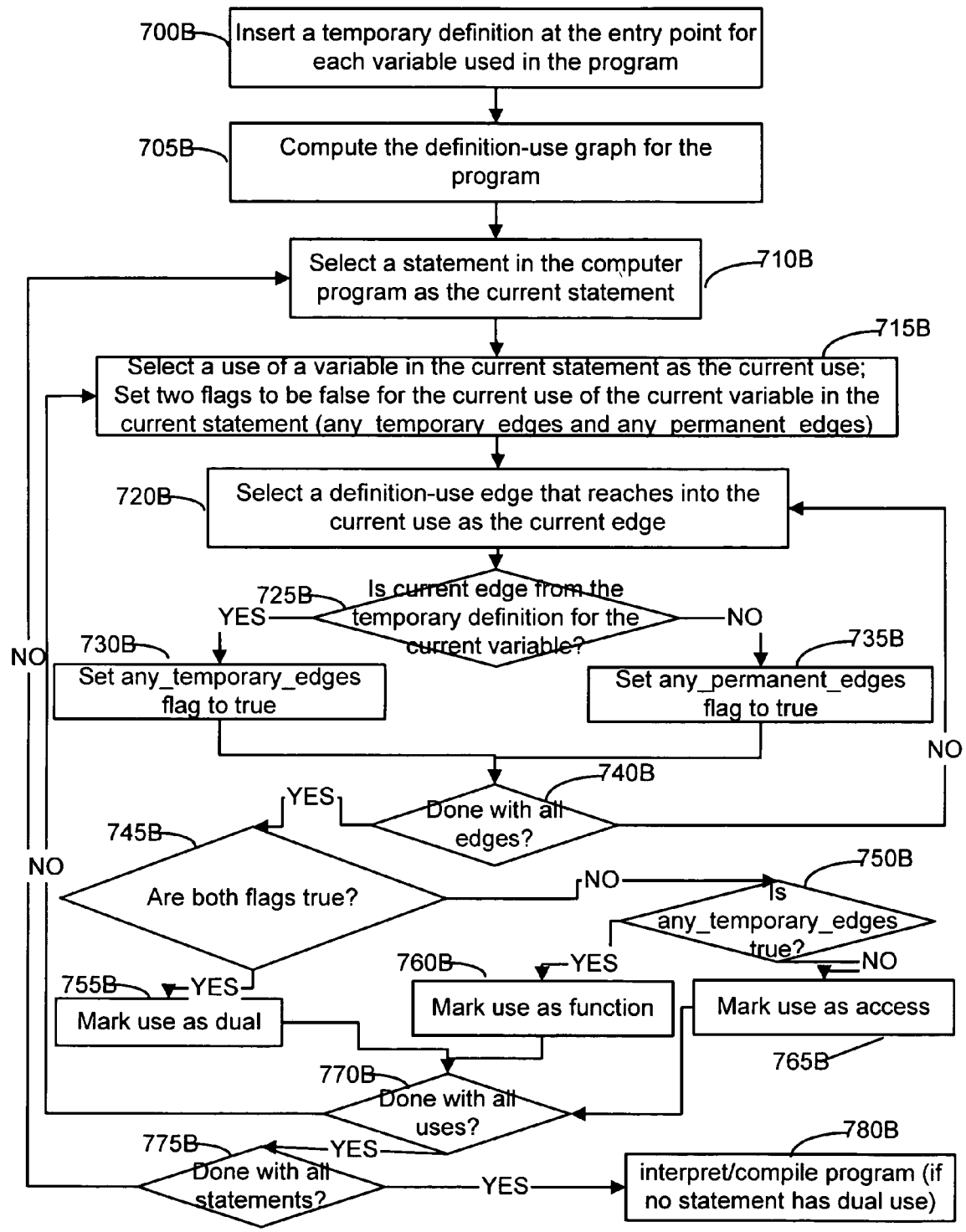

FIGS. 7A and 7B illustrate, via a high level flow chart, an alternative embodiment for determining the information required in act 130 of FIG. 1, using definition-use edges. The embodiment illustrated in FIG. 7A (as do all embodiments) inserts a temporary definition via act 700 for each variable used in the program into an entry statement for the program. Note that other embodiments prune the number of temporary definitions that are required by analyzing the program for syntactic indicators of variables that must be either variables or functions. For instance, in most programming languages, variables that appear directly to the left of an assignment operator cannot be function calls. Alternative embodiments utilize indicators such as this, input from users, or other similar methods to reduce the number of temporary definitions that are required. Some of the indicators used by alternative embodiments are illustrated in FIGS. 17A-17D.

Once the temporary definition has been inserted in act 700, the programmed computer computes a definition-use graph for the program in act 705. This computation is illustrated for one embodiment in FIG. 7B. In computing the definition-use graph, the programmed computer assumes that any ambiguous references are memory accesses, rather than function calls. This assumption simplifies the computation of the graph, and is valid assuming that functions are not able to directly set variables in other function's calling spaces.

Figure 8A:
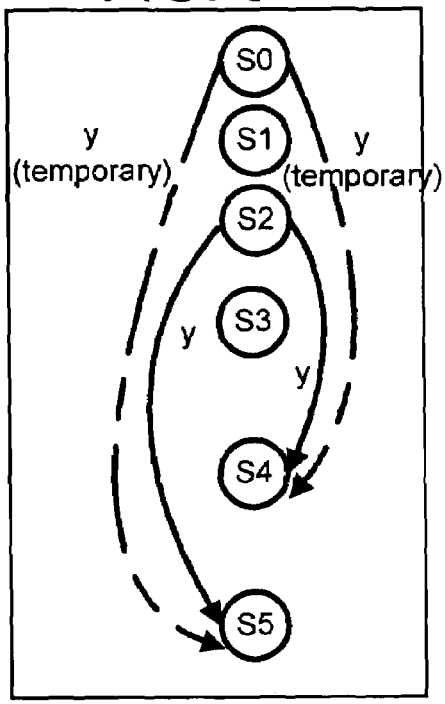
FIGS. 8A-8C illustrate, in high level diagrams, temporary and permanent definition-use edges contained in a computer's memory during the performance of the acts in some embodiments illustrated in FIG. 7A.
Figure 8B:
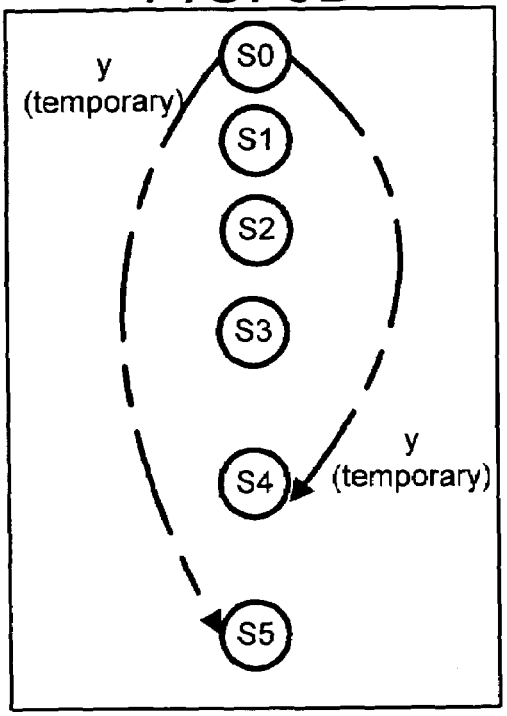
Figure 8C:
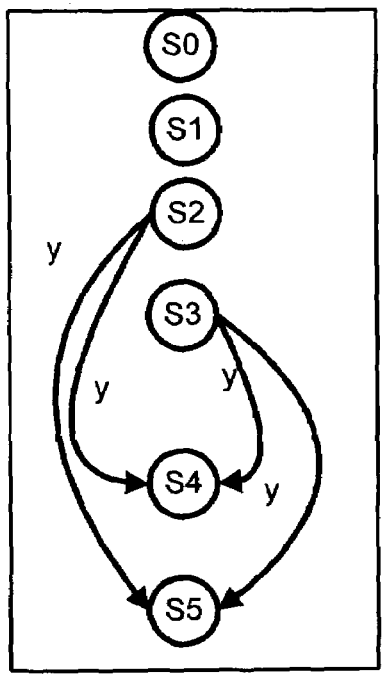

Once the definition-use graph has been computed, the programmed computer selects a statement in act 710 in which to resolve ambiguous references. Having selected a statement, the computer next selects an ambiguous name in act 715. In act 720, the programmed computer examines all the definition-use edges into the current statement that result from the ambiguous name. FIGS. 8A, 8B, and 8C illustrate definition-use graphs and the possible patterns that may occur with respect to temporary and permanent definitions.

A definition-use graph is a graph that provides a link from a definition of a variable to all uses that may possibly use it, and simultaneously, a link from a use of a variable to all definitions that may set the value it receives. These links may be effected in many different ways, and a skilled artisan, in view of these disclosures, may easily apply these different implementations to this problem. FIG. 8A illustrates the definition-use graph for the program input from FIG. 2A, with only the edges created by the variable "y" shown. Edges from the temporary definitions (also called "temporary edges") are dotted; edges from permanent definitions (also called "permanent edges") are solid. In FIG. 8A, there are two edges emanating from statement S0 (both dotted, since S0 is a temporary definition). One of the edges goes to statement S4, representing the fact that the temporary definition may be used for a value of "y" in statement S4, and the other goes to statement S5. Similarly there are permanent edges from S2 to S4 and S5, representing the fact that the value created for "y" in S2 may be used by S4 and S5. The full graph will also contain edges for the definitions and uses of variable "x"; these edges have been omitted for clarity.

FIG. 8B illustrates the definition-use graph for the program input from FIG. 3A, with only the edges created by the variable "y" shown. Dotted edges emanate from S0 to S4 and S5, representing the fact that only temporary edges can create values for "y" as used in S4 and S5. Again, the full graph will also contain edges for the definition and uses of variable "x"; these edges have been omitted for clarity. FIG. 8C illustrates the definition-use graph for the program input from FIG. 4A. There are permanent edges from each of S2 and S3 to S4 and S5, representing the fact that S2 and S3 are the only source of value for "y" as used in S4 and S5. Again, the full graph will also contain edges for the definition and uses of variable "x"; these edges have been omitted for clarity.

Note that FIGS. 6A-6F illustrate one embodiment of the invention which utilizes reachability sets in the form of bit vectors to represent the dataflow information. Another embodiment illustrated in FIGS. 8A-8C represents dataflow information as a definition-use graph. Other embodiments use other representations. To the best knowledge of the applicant, there is no one best embodiment of this invention with respect to representation of dataflow information. Instead, the best embodiment depends on other factors surrounding the invention. For instance, if the invention is used as part of an optimizing compiler for a dynamically-typed language, where other dataflow-based optimizations are to be performed, a definition-use graph may be the best choice (depending on which optimizations are to be performed), since it simplifies many transformations. If, instead, the invention is used as part of an interpreter which performs interprocedural-based analysis, bit vectors may well be sufficient, and the extra overhead of computing a definition-use graph is probably unwarranted.

Using the definition-use graph, the programmed computer in act 720 (FIG. 7A) determines whether a reference is a function call, memory access, or dual use. It first determines whether all the definition-edges coming into current use are temporary definitions. If yes, the programmed computer has determined that the use is a function call, marks it as such in act 725, and proceeds to examine another use via act 745. If no, it then tests in act 730 whether all edges that come into the use are permanent edges. If so, the programmed computer marks the use as a memory access in act 740, and proceeds to examine another use via act 745. If not, the computer marks the use as dual in act 735 and proceeds to examine another use via act 745. Note that the existence of temporary definitions for all variables used in the program ensures that at least one definition-use edge will reach a variable use, so there is no need to check for the case of no edges coming into a variable (which could be interpreted as either all permanent edges or all temporary edges).

In act 745, the programmed computer tests whether it has examined all uses in the current statement. If not, it proceeds back to act 715 and selects another use to test. If it has examined all uses, it proceeds to act 750 to test whether it has examined all statements in the program. If not, it proceeds back to act 710 to select another statement to test. If it has examined all statements, it proceeds to act 755 to utilize the information it has built to compile, interpret, or optimize the program.

FIG. 7B illustrates an alternative embodiment utilizing definition-use edges, utilizing flags to record the information. A programmed computer following FIG. 7B begins as in FIG. 7A, by inserting a temporary definition for all variables used (act 700B) and by constructing the definition-use graph for the resulting program (act 705B). It then selects a statement to use as the current statement in act 710B. Following that, it selects a use from that statement to use as the current use, and sets two flags to be false in act 715B. These flags are used to record whether any permanent edges and whether any temporary edges reach the current use, respectively.

The programmed computer will next select a definition-use edge that reaches into the current use in act 720B to use as the "current edge". If the current edge is temporary (tested in act 725B), the programmed computer sets one flag to be true (act 730B); otherwise, it sets the other flag to be true (act 735B). Either way, it then tests whether all edges have been examined in act 740B. If not, then it returns to act 720B to continue processing edges.

When the test in act 740B is true, the programmed computer then tests in act 745B whether both flags have been set to true. If yes, then the use is a dual use and the computer flags it as such in act 755B, then proceeds to act 770B to determine if there are more uses to examine. If both flags are not true, the programmed computer tests in act 750B whether there are any temporary edges. If yes, then there are only temporary edges, and the computer proceeds to act 760B to mark the use as a function call, and then to act 770B to determine if there are more uses to examine. If the test in act 750B results in false, then the computer proceeds to act 765B to mark the use as a memory access and then to act 770B to determine if there are more uses to examine. In act 770B, the programmed computer tests whether it has examined all uses in the current statement. If not, it returns to act 715B to select a next use to process. If so, it proceeds to act 775B to determine whether it has processed all statements. If not, it returns to act 710B to select another statement to process. Otherwise, it proceeds to act 780B to compile, interpret, optimize, or otherwise continue processing the user's program.

All embodiments of the invention insert a temporary definition for variables, and control flow information is used to determine whether those temporary definitions reach uses or not. Some embodiments insert temporary definitions for all variables; other embodiments prune the set of variables for which temporary definitions are inserted by using syntactic clues from the language or other similar clues; but all embodiments insert at least one temporary definition. Similarly, different embodiments analyze execution paths in different ways. Some embodiments use sets or bit vectors; other embodiments use definition-use graphs in various forms; others use other methods of analyzing control and data flow.

Figure 8D:
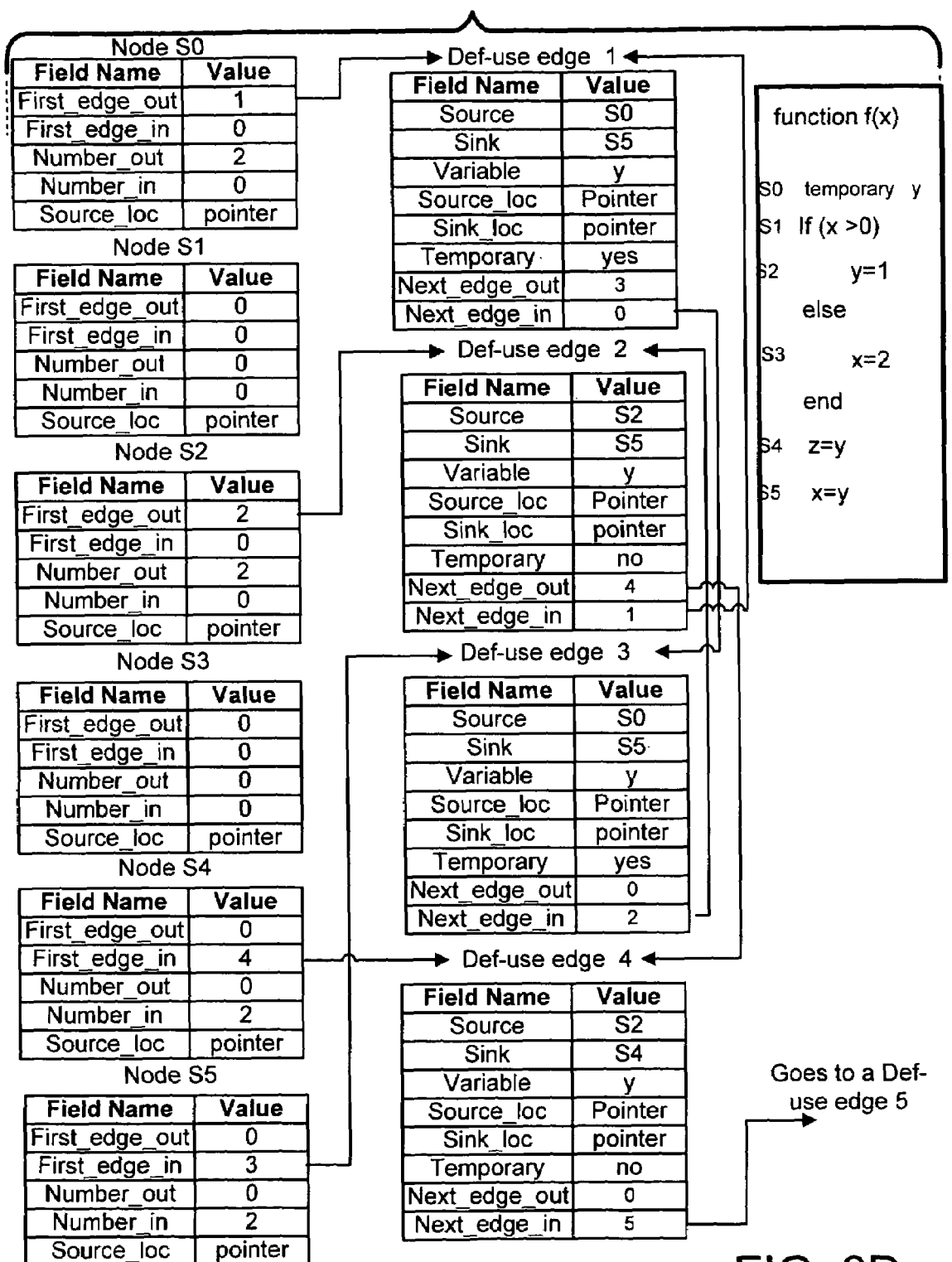
FIG. 8D illustrates, in a high level block diagram, data structures contained in a computer's memory in some embodiments for the definition-use edges described in FIGS. 8A-8C.

FIG. 8D illustrates, via a high level block diagram, the representation in a computer's memory of the definition-use graph in one embodiment. The graph is for the user's program as provided in FIG. 2A. Abstractly, a definition-use graph is comprised of a set of nodes and a set of edges between those nodes. In the concrete implementation of the embodiment illustrated in FIG. 8D, the set of nodes is stored as an array with members S0, S1, S2, and so on, and the set of edges is stored as an array Def-use edge 1, Def-use edge 2, and so on. A skilled artisan will readily recognize in view of these disclosures that there are a large number of alternative representations that equivalently represent definition-use graphs. Nodes in FIG. 8D are comprised of a number of fields. The "First_edge_out" field is an indicator (which may be a pointer, an array index, or other similar indicator) for the first edge in a list of edges that emanate from this node. The "First_edge_out" of node S0, for instance, is edge 1, and edge 1 represents a definition that reaches from node S0 to node S5. The "First_edge_in" field is an indicator (which again may be a pointer, an array index, or other similar indicator) for the first edge in a list of edges that go into this node. The "First_edge_in" of node S4, for instance, is edge 4, and edge 4 represents a definition that reaches from node S2 into node S4. The "Number_out" field is the number of edges that emanate from this node, or alternatively, the number of elements on the list of edges that starts from the "First_edge_out" field. The "Number_in" field is the number of edges that enter into this node, or alternatively, the number of elements on the list of edges that starts from the "First_edge_in" field. The "Source_loc" is an indicator of the intermediate representation that corresponds to this node.

Edges in this embodiment are also comprised of a number of fields. The "Source" field indicates the node that is the source of the definition-use edge, and similarly, the "Sink" field indicates the node that is the sink of the definition-use edge. For instance, edge 2 represents a definition in node S2 reaching a use in node S5. The "Variable" field holds the variable that gives rise to the definition-use edge. For instance, the "Variable" field in edge 2 being "y" indicates that "y" is the variable that is defined in node S2 and used in node S5. "Source_loc" and "Sink_loc" are indicators into the intermediate representation of the program for the tree locations that give rise to the definition and use for the definition-use edge, respectively. "Temporary" is set to yes for edges that are temporary edges and to no for edges that are permanent. "Next_edge_out" and "Next_edge_in" are used to link edges together that emanate from or go into the same definition or use, respectively. For instance, the "Next_edge_out" field of edge 1 having a value 3 means that edge 3 is the next edge that has the same "Source" as edge 1 (i.e. node S0). The "Next_edgein" field of edge 2 having a value 1 means that edge 1 is the next edge that has the same "Sink" as edge 2 (i.e. S5).

Figure 8E:
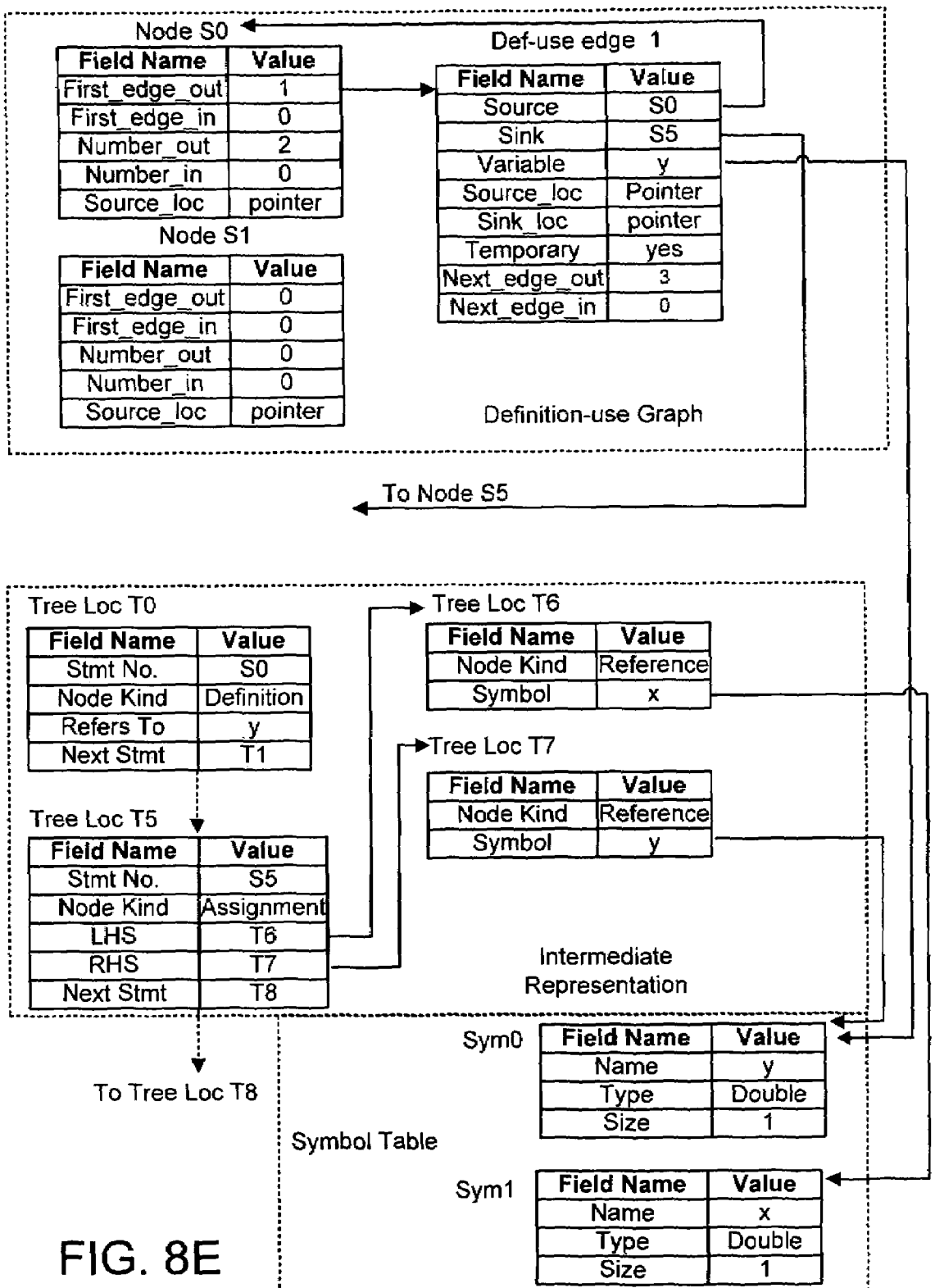
FIG. 8E illustrates, in a high level block diagram, the relationship between the data structures contained in a computer's memory in FIG. 8D for some embodiments and other structures also present in the computer's memory.

FIG. 8E illustrates, via a high level block diagram, the state of a computer's memory in one embodiment of the invention while separating function calls, memory accesses, and dual usage for the users program illustrated in FIGS. 2A and 2B. The definition-use graph, as fully described in FIG. 8D, is one component of the computer's memory. Other components in this embodiment include the Intermediate Representation (comprised of Tree Locs, which hold the semantic representation of the program), the Symbol Table (comprised of Syms, which hold information about the variables used in the user's program), and other data structures holding program content. In this embodiment, Tree Locs are comprised of several kinds of nodes, related to the semantic content of the user program. The fragment in FIG. 8E illustrates 3 kinds of Tree Locs: Definitions (represent temporary definitions), Assignments (represent the assignment of a value to a variable) and References (represent the use of a variable). Tree Loc T5, for instance, is an Assignment Tree Loc: it has a "LHS" field (that holds the left hand side of the assignment), a "RHS" field (that holds the right hand side of the assignment), a "Next Stmt" field (that holds the Tree Loc of the statement that follows the assignment), and a "Stmt No" field (that holds an identifying number for the statement). Similarly, the nodes in the Symbol Table hold information about the symbols, such as their "Name", "Type", and "Size". Different embodiments may use different memory representations, which, in view of this disclosure, a skilled artisan can recognize as being equivalent in functionality to this embodiment. The essential aspect of definition-use graphs of this invention is the ability to model a temporary definition for appropriate edges.

Figure 9:
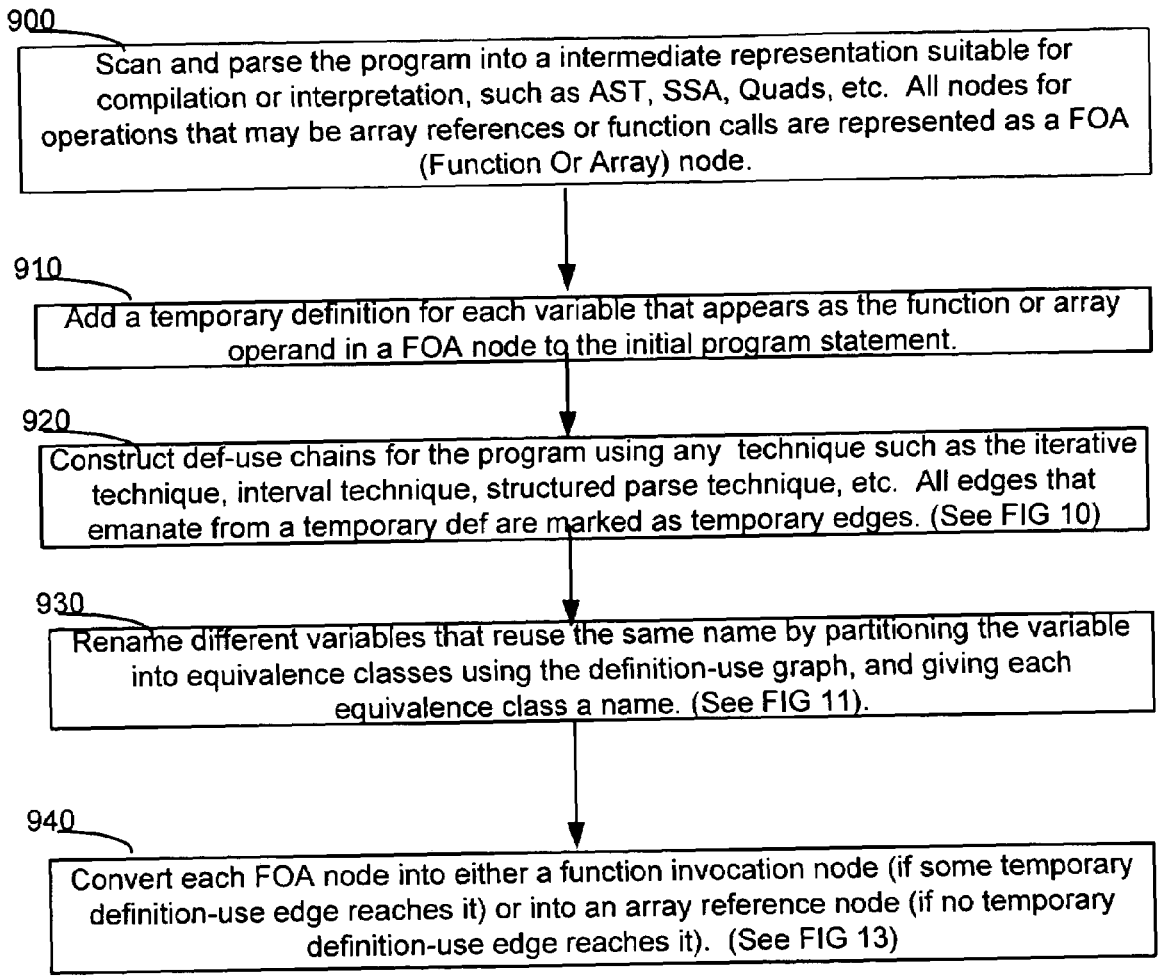
FIG. 9 illustrates, in a high level flow chart, acts performed by some embodiments of the invention when combining variable renaming with the detection of function calls, memory accesses, and dual usages.

FIG. 9 illustrates, via a high level flow chart, one embodiment of the invention as it is employed within a programmed computer. The programmed computer first scans and parses the user's program into an intermediate representation via act 900. Many standard techniques exist for scanning and parsing programs into intermediate representations (such as LALR parsers, top-down parsers, and recursive descent parsers, among others), and different embodiments of the invention employ different techniques. There are also many standard compiler intermediate representations (such as AST, quads, and SSA, among others) and again, different embodiments of the invention employ different representations. For convenience, the illustration of this embodiment in FIG. 9 assumes the existence of a special representation for ambiguous references (Function or Array nodes), but in view of this disclosure, a skilled artisan may envision other methods of representation.

After converting the user's program into a convenient intermediate representation, the programmed computer adds a temporary definition for each variable used in the program via act 910. As described previously, in view of this disclosure a skilled artisan may easily prune the number of variables for which temporary definitions must be added by taking advantage of syntactic clues provided by the language.

Figure 10:
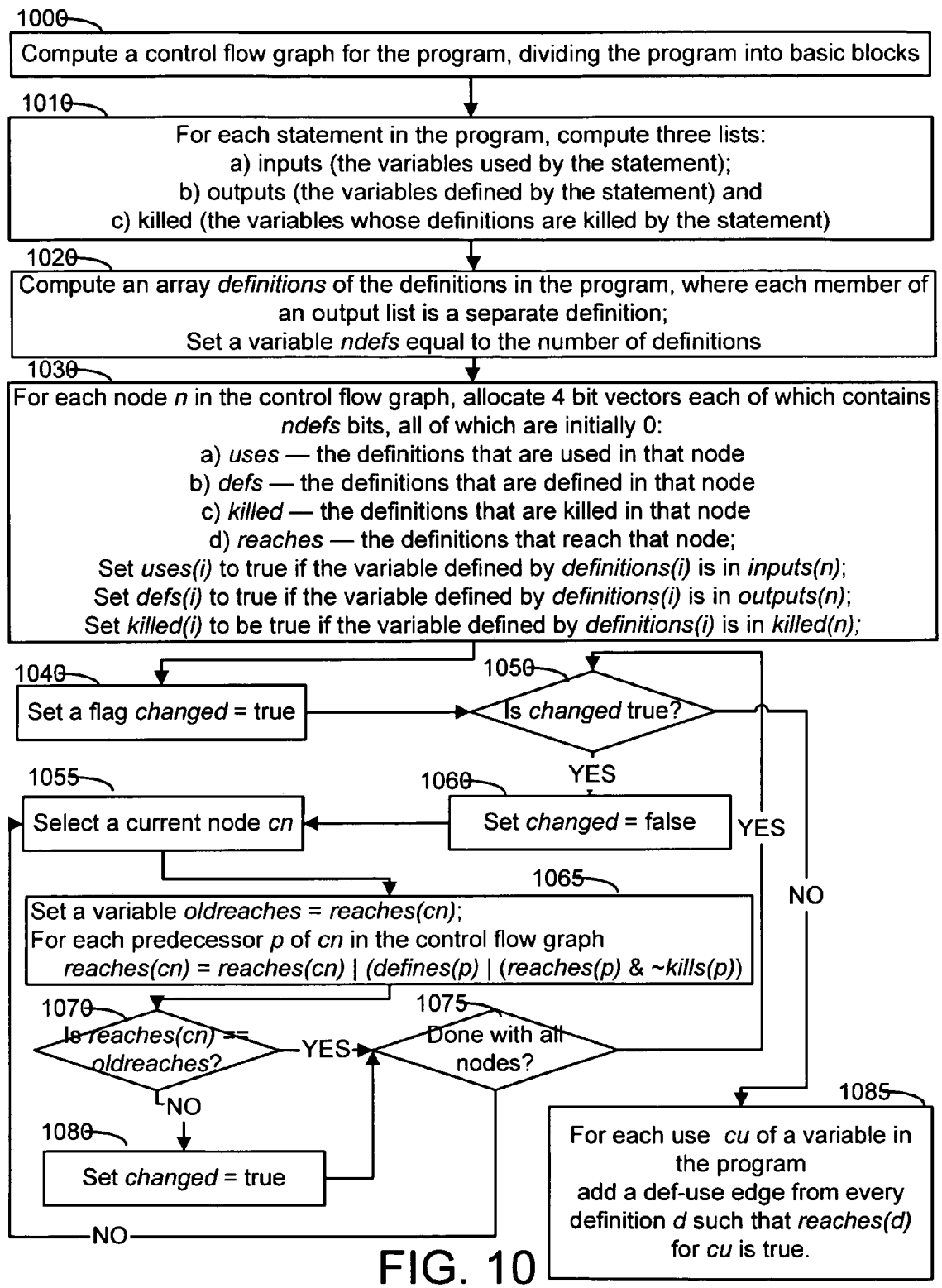
FIG. 10 illustrates, in a high level flow chart, acts performed by some embodiments of the invention during the construction of the definition-use graph.

After temporary definitions have been inserted, the programmed computer in this embodiment constructs the definition-use graph for the program via act 920. There are many methods for constructing definition-use graphs, (such as the iterative technique, the interval technique, and the structured-parse technique, among others). Other embodiments employ different methods for constructing definition-use graphs. As described earlier, different embodiments of this invention use different techniques for analyzing execution paths other than definition-use graph. FIG. 10 illustrates the details of the method used to construct the definition-use graph in this embodiment.

Figure 9A:
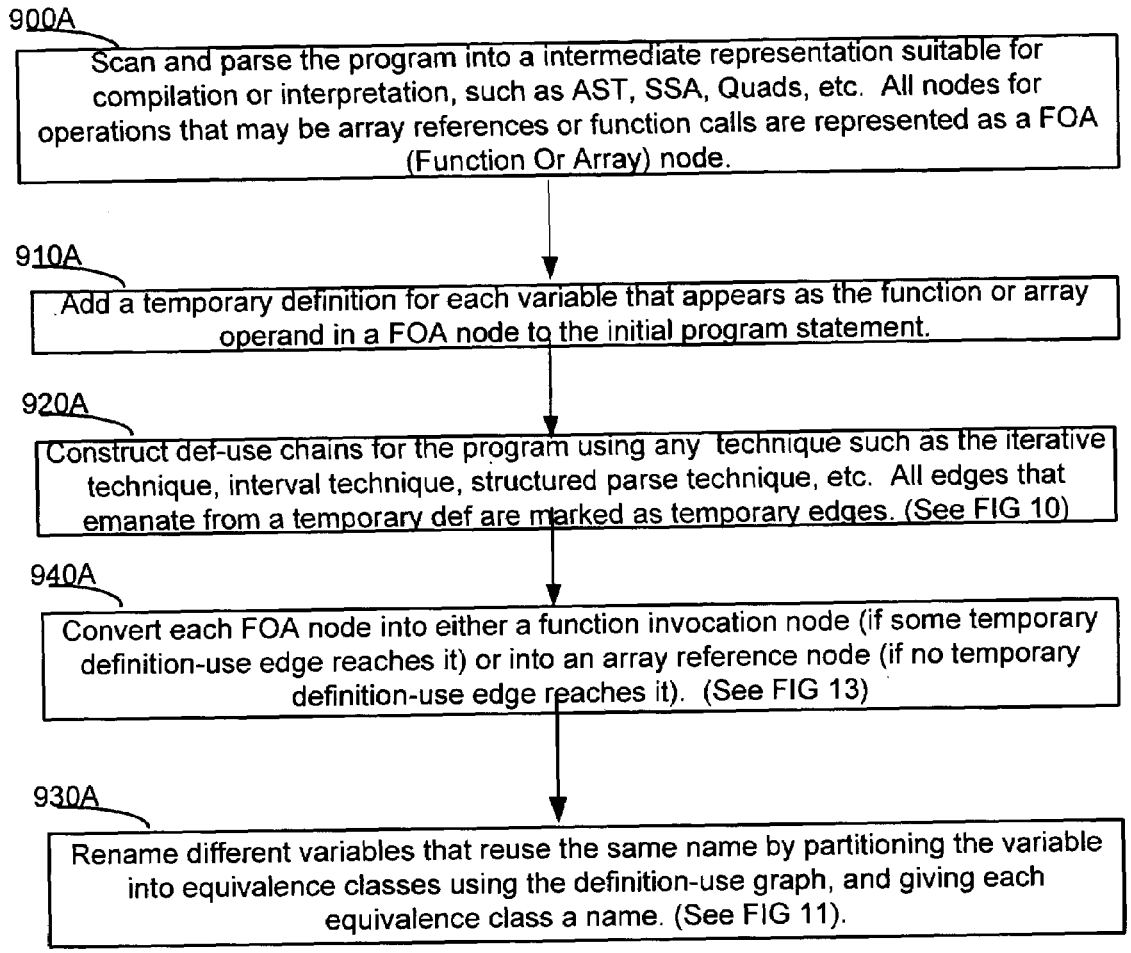
FIG. 9A illustrates, in a high level flow chart, acts performed by an alternative embodiment when variable renaming is performed in a different ordering with respect to ambiguous reference resolution.
Figure 11:
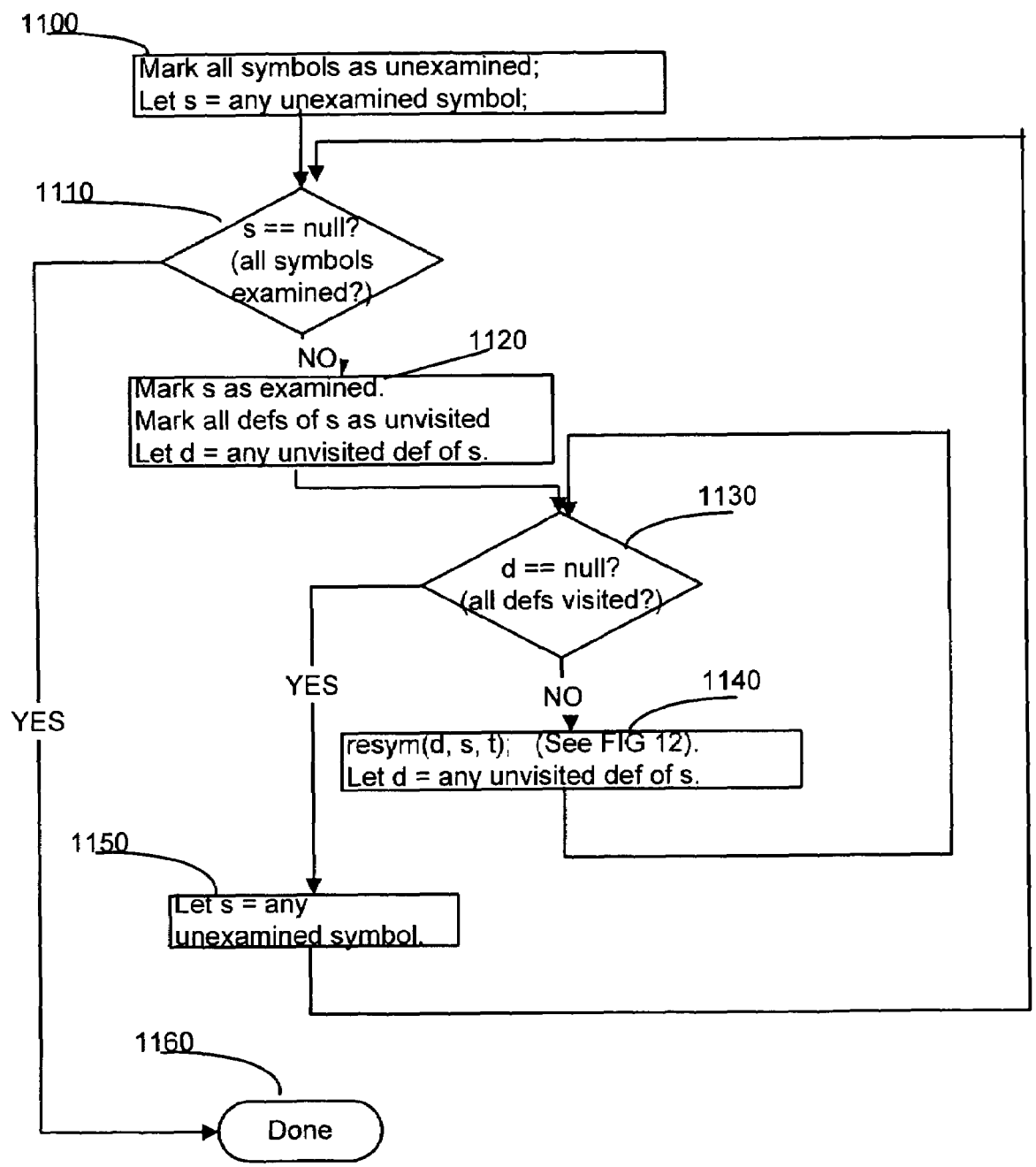
FIGS. 11 and 12 illustrate, in high level flow charts, acts performed by some embodiments of the invention to rename variables.

Once the definition-use graph has been constructed, the programmed computer effects an optimization technique known as variable renaming via act 930. Details of the technique used for variable renaming in this embodiment are illustrated in FIG. 11. Variable renaming partitions references to a given variable into different equivalence classes, where a reference is put into a given equivalence class if it must occupy the same memory locations as all other members of the equivalence class. Variable renaming is a transformation effected in this particular embodiment; other embodiments do not effect this transformation. Similarly, this embodiment effects variable renaming before separating function calls, memory accesses, and dual usages (act 940); other embodiments use different orders. Specifically, at least one embodiment performs variable renaming after separating function calls, memory accesses, and dual usages. FIG. 9A illustrates such an embodiment; the acts in FIG. 9A correspond to the similarly named act in FIG. 9, but the order in which variable renaming occurs is different.

Variable renaming, as discussed in the embodiment of FIG. 9 and FIG. 9A, is shown as being employed in the context of dynamically-typed languages. Such use of variable renaming in certain embodiments significantly improves the resolution of ambiguous references into function calls, memory accesses, and dual usages, as illustrated by FIGS. 15A and 15B, which are renamed versions of FIGS. 14A and 14B, as discussed in the next paragraph. Such variable renaming is a transformation not described by any of Padua and DeRose, Padua and Almasi, or Holler.

Figure 13:
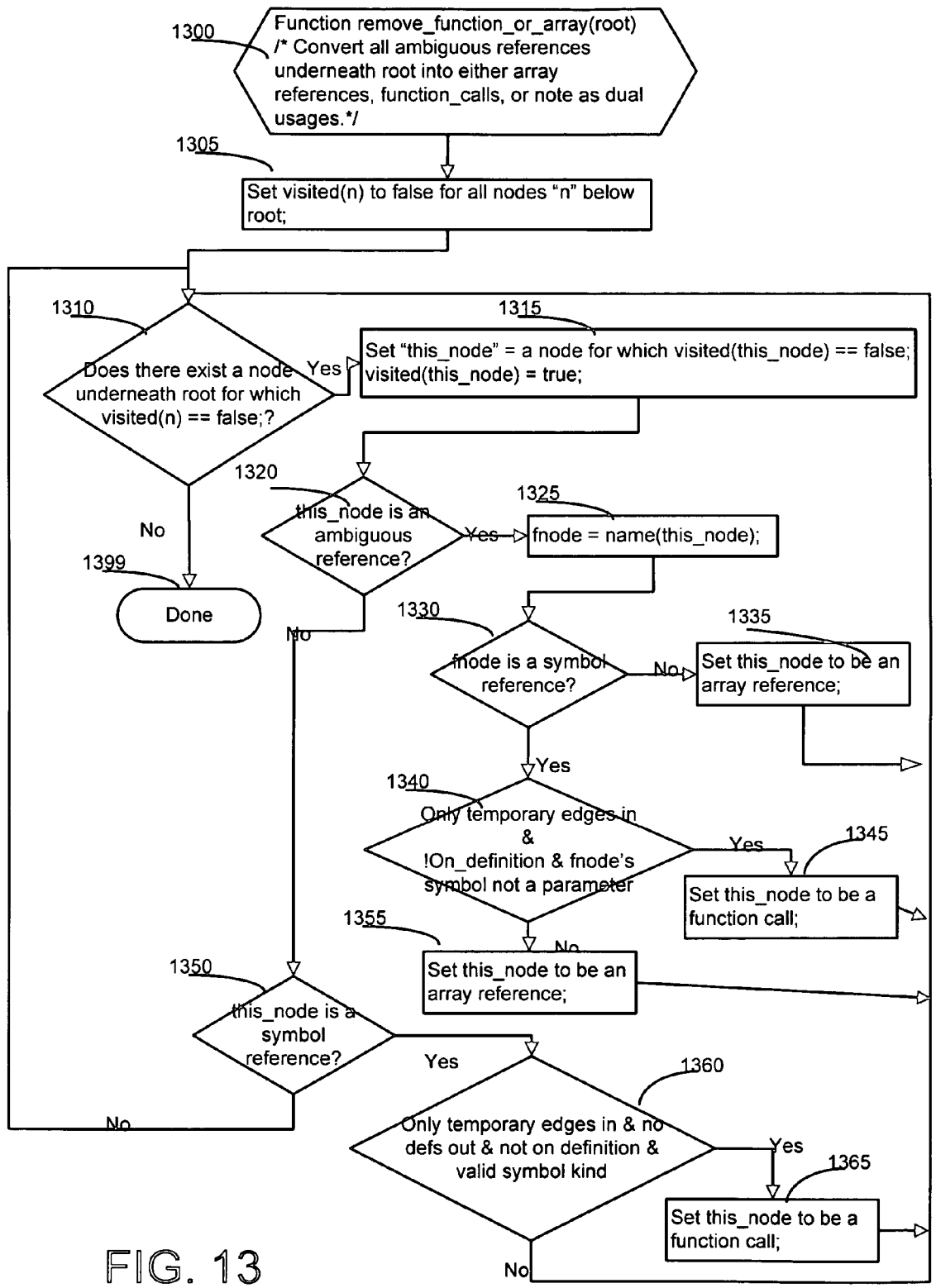
FIG. 13 illustrates, in a high level flow chart, acts performed by some embodiments of the invention to detect function calls, memory accesses, and dual usages.

In this embodiment, after the programmed computer effects act 930, it proceeds to act 940 to convert all ambiguous references into function calls, memory accesses, or dual usages. The method used in this embodiment is illustrated in FIG. 13; other embodiments use different methods.

FIG. 10 illustrates, via a high level flow chart, the steps taken in act 920 of FIG. 9 in order to construct the definition-use graph. These actions are specific to this embodiment; other embodiments construct the definition-use graph in different ways, or use methods other than definition-use graphs to analyze execution paths. In act 1000, the programmed computer constructs the control flow graph for intermediate representation of the user's program. Standard techniques exist for constructing control flow graphs, and different embodiments use different methods in the construction. Following construction of the control flow graph in act 1000, the programmed computer constructs 3 lists for every statement in the program in act 1010. These lists are "inputs" (a list of the variables used in the statement), "outputs" (the variables whose values may be set in the statement), and "killed" (the variables whose values are totally replaced in the statement).

Note that when inserting temporary definitions via acts 910 and 910A of FIGS. 9 and 9A, respectively, it is not necessary to actually insert assignment statements into the program or intermediate representation. Some embodiments merely add extra entries to the "output" list for the entry statement to effect this temporary definition. Other embodiments modify the internal data structures used to compute the definition-use graph or similar structure without directly modifying the intermediate representation of the program proper.

Following construction of the input lists, output lists, and killed lists, the programmed computer constructs an array "definitions" of all the definitions in the program in act 1020. Each element of any "output" list in the program is a separate definition. The programmed computer also sets a variable "ndefs" to hold the number of definitions that occur in the program. This information is used by the programmed computer in act 1030 to create a set of bit vectors for each node in the control flow graph, and to set the values of those vectors. These vectors are "uses" (the bit corresponding to a definition is set to 1 if the definition is used in the node and 0 if not), "defs" (the bit corresponding to a definition is set to 1 if the variable defined by the definition is defined in the node and 0 if not), "killed" (the bit corresponding to a definition is set to 1 if the variable defined by the definition is killed in the node, and 0 if not), and "reaches" (which will eventually be the set of definitions that reach the node).

Once the local bit vectors are constructed, the programmed computer enters an iterative loop in act 1040 where it iterates over the bit vectors until a fixed point is reached. In act 1040, the programmed computer sets a flag "changed" to true. This initialization is necessary to cause the following loop in act 1050 to trigger. When changed is true, the programmed computer proceeds from act 1050 to act 1060 to set "changed" to false. Following that, the programmed computer selects a node from the control flow graph to be the current node "cn" (act 1055). In act 1065, the programmed variable saves the initial value of "reaches(cn)" into a temporary "old_reaches", then updates a new value for "reaches(cn)" based on the values that have propagated to the predecessors of the node using the equation "reaches (cn)=reaches(cn)|(defines(p)|(reaches(p) & ~kills(p)))". Note that the symbol "|" represents "or" (equivalent to set union) and the symbol "&" represents "and" (equivalent to set intersection).

In act 1070, the programmed computer tests whether the newly computed value of "reaches(cn)" is equal to the value prior to the update. If not, the programmed computer sets "changed" to true in act 1080. The programmed computer then checks whether all nodes (or blocks) have been processed in act 1075. If they have not, the programmed computer proceeds to act 1055 to select and process another node in the control flow graph. If all nodes have been processed, the programmed computer has completed one iteration of the algorithm. It then proceeds to act 1050 to determine whether the fixed point has been reached. If not, the programmed computer performs another iteration, starting with act 1060. If yes, so that the fixed point solution has been computed, the reaches vectors have been globally computed, and the programmed computer converts those vectors into a definition-use graph via act 1085.

Figure 12:
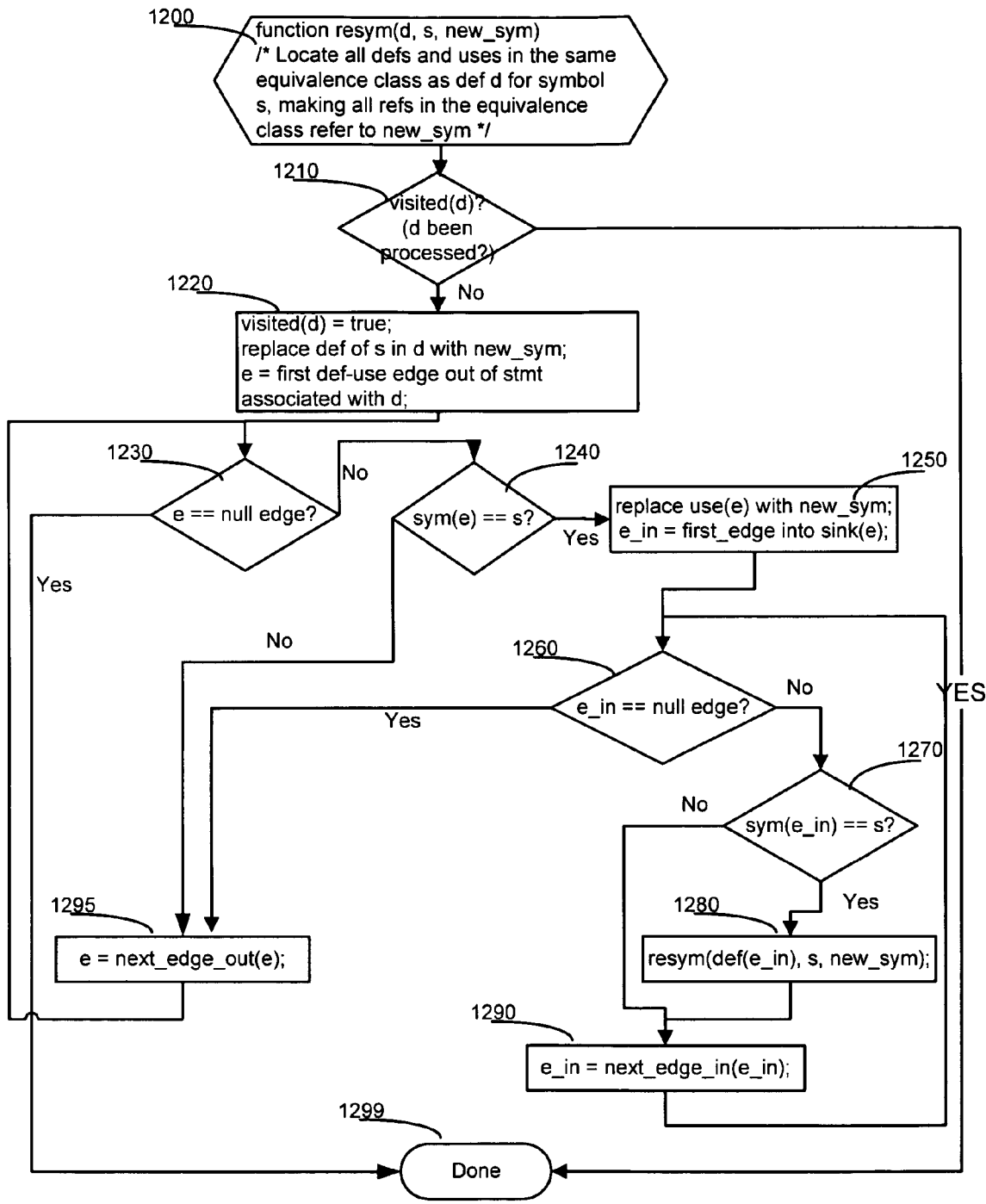

The transformation of variable renaming, as illustrated in FIGS. 11 and 12 is one not described in any of De Rose and Padua, Almasi and Padua, or Holler. This transformation can significantly reduce the number of reported dual usages, as illustrated by the program in FIGS. 14A and 14B. FIGS. 15A and 15B illustrate the effects of variable renaming on that program. This transformation is not possible in De Rose and Padua's or Almasi and Padua's approach, because they search for dual usage using a different lattice than that required by renaming. Holler's approach is focused on a different problem in a statically-typed language, and as such, does not benefit from variable renaming.

FIG. 11 illustrates, in a high level flow chart, the implementation of variable renaming (act 930 of FIG. 9) in one embodiment of the invention. The implementation is based on a definition-use graph, and assumes that the graph has been built and is available. In act 1100, the programmed computer marks all symbols in the user's program as unexamined. It examines each symbol one at a time, at which time it marks the symbol as examined, so that it processes each symbol only once. The programmed computer then selects any unexamined symbol and calls it "s".

The programmed computer then tests for "s" being null in act 1110. If it is null, the computer assumes that all symbols have been examined (when there are no unexamined symbols, the selection agent returns null rather than a valid symbol), and the process is complete. Otherwise the programmed computer proceeds to act 1120, where it marks "s" as examined, marks all defs (that is, all references on the "defs" list from FIG. 10, act 1030 that involve the symbol "s") of "s" as unvisited, and selects an unvisited def "d" of "s".

In act 1130, the programmed computer tests whether "d" is null, the assumption being that when all defs for "s" have been visited the selection agent returns null. If the answer is "yes", the programmed computer executes act 1150 to select another unexamined symbol and iterates through the loop starting at act 1110. If "d" is an unexamined definition, the programmed computer executes act 1140, which locates and changes all references "s" that are in the same equivalence class as "d" to be a unique symbol. This transformation is effected by the procedure call "resym", detailed in FIG. 12. "Resym" is passed the definition as a start of the equivalence class, the symbol that is the basis for the equivalence class, and a new temporary symbol ("t") which is to be the new symbol used for all references in the equivalence class. The programmed computer then iterates again through act 1130. When the computer processes all definitions of all symbols, it has completed the renaming.

The recursive procedure "resym" for one embodiment is illustrated in a high level flow chart in FIG. 12. The programmed computer initiates execution for resym starting in act 1200, and proceeds to act 1210 where it tests whether the passed in definition "d" has been visited. If "d" has already been visited, then all references in its equivalence class have already been determined, so there is nothing for the programmed computer to do. Accordingly, it executes act 1299 to return.

If "d" has not been previously visited, the programmed computer executes act 1220 to mark "d" as visited and replace the definition of "s" in "d" with the new symbol "new_sym". After this step, the intermediate representation will now reflect that a symbol "new_sym" is now changing value in the statement represented by "d", rather than the symbol "s". The programmed computer then selects a definition-use edge "e" that emanates from the statement associated with the definition "s".

In act 1230, the programmed computer tests whether "e" is a null edge. If it is, all edges emanating from the statement associated with "d" have been examined, and the equivalence class has been determined. Accordingly, the programmed computer returns via act 1299. If "e" is not null, the programmed computer executes act 1240 to see if the symbol associated with "e" is "s", the symbol we are processing (statements can define multiple variables, and we only want to process the edges that are associated with the symbol "s"). If the symbol is not "s", the programmed computer skips over this edge by executing act 1295 and continues with the next edge in the list. If the variable associated with the edge "e" is "s", the programmed computer executes act 1250 to replace the use of "s" that is the sink of "e" with the new symbol "new_sym". It then sets "e_in" to be the first of the list of edges that come into the statement that represents the sink of "e".

In act 1260, the programmed computer tests whether "e_in" is the null edge. If it is (the test answers "yes"), then all edges coming into the use referenced in act 1250 have been processed, so the programmed computer executes act 1295 to get the next edge that comes out of "d". If not, the programmed computer tests in act 1270 whether the symbol associated with "e_in" is "s". If not, it will skip over this edge (following the reasoning for act 1240) and execute act 1290 to get the next incoming edge. Otherwise, it proceeds to act 1280, where it locates the definition associated with the source of "e_in", then recursively calls "resym" on that definition with the same old and replacement symbols. When complete, it proceeds to act 1290 to process the next edge. It then loops back to act 1240, which eventually loops back to act 1230, which will return when all edges have been processed.

FIG. 13 illustrates in a high level flow chart acts performed in one embodiment of the invention in performing the conversion of act 940 in FIG. 9. During this conversion, the programmed computer walks (i.e. visits each node in) a section of the intermediate representation and makes use of the definition-use graph to determine whether references are function calls, memory accesses, or dual usage. The programmed computer receives a location in the intermediate representation ("root") in act 1300, which delineates the section of the intermediate representation over which the computer is to convert ambiguous references. The programmed computer starts in act 1305 by marking all tree locations accessible from "root" as being unvisited. It then executes act 1310 where it repeatedly selects unvisited tree locations (and processes each location as per acts 1315-1365 discussed below) until all locations have been visited. At that point, the conversion is complete and the computer returns via act 1399.

While it is able to find an unvisited tree location, the programmed computer assigns the value of the unvisited tree location to "this_node" in act 1315 and marks the tree location as having been visited. It then tests in act 1320 whether "this_node" is an ambiguous reference. An ambiguous reference in this embodiment, which is used for the MATLAB programming language, is a name which is followed by an open parenthesis, some number of comma-separated expressions and ended with a close parenthesis. The comma-separated expressions may be subscript values for an array reference or parameters to pass to a function call. Inside the tree representation, this name is held in a tree location (called "fnode" in FIG. 13). The comma-separated expressions are held in another tree location which is a sibling to "fnode" (same hierarchy level); both fnode and the tree location holding the comma-separated expressions are children of "this_node". The programmed computer extracts the name held in "fnode" in act 1330. In MATLAB, if this name is not a symbol (an addition operator, for instance, is not a symbol), then "this_node" can only be an array access. In that case, the programmed computer executes act 1335 to make the tree location an array access, then proceeds to act 1310 to select another unvisited tree location.

If "this_node" is a symbol reference, then the programmed computer executes act 1340, which is primarily testing whether there are only temporary edges reaching the use represented by "this_node". This embodiment performs additional tests that are not present in other embodiments. These tests are required because act 1310, in visiting all the tree locations in the intermediate representation, visits both uses and definitions of variables. Since definitions will not be reached by any definition-use edges (definitions are the source of such edges, but cannot be the sink), they will not be reached by any permanent edges. The criterion for identifying an ambiguous reference as an array reference is having all incoming edges be permanent edges. Since definitions have no incoming edges, they can mistakenly be classified as function calls, unless further analysis is performed as discussed next.

The "On_definition" variable is true if the ambiguous reference appears as the target of an assignment, in which case it cannot be a function call. Similarly, the test "fnode's symbol is a parameter" performed in act 1340 is an artifact of this embodiment and is necessary because temporary definitions are inserted in statement 0 of the user program. In this embodiment, statement 0 also holds user definitions of parameters, so in this statement with respect to parameters, no distinction is drawn between permanent and temporary definitions. Instead, the distinction is implemented by the additional test as follows. If either "On_definition" is true or the test "fnode's symbol is a parameter" is true, then the ambiguous name cannot be a function call and must be an array access. If there are only temporary edges and the additional tests are true, the programmed computer sets "this_node" to be a function call in act 1345 and then proceeds to act 1310 to select another unvisited tree location. Otherwise, it sets "this_node" to be an array access in act 1355 and then proceeds to act 1310 to select another unvisited tree location.

When the test in act 1320 is false, the programmed computer tests in act 1350 whether the node represents a symbol node that is not followed by an open parenthesis. In this embodiment, which supports MATLAB, function calls with no arguments do not have following parentheses, so it is necessary to determine whether an ambiguous symbol used without following parentheses is a function call or a scalar access. This test is effected in act 1360, using the same basic test as act 1340. If all incoming edges are temporary edges, "this_node" is set to be a function call in act 1365, and another unvisited tree location is selected in act 1310. If all incoming edges are permanent edges, "this_node" is left alone (because it is a scalar access, it has previously been set with a memory access type in this embodiment). Another unvisited tree location is then selected by the programmed computer in act 1310. The embodiment illustrated in FIG. 13 assumes that any dual usages have been detected and reported prior to its invocation as per FIG. 9, so that all ambiguous references will be either function calls or memory accesses.

Figure 14A:
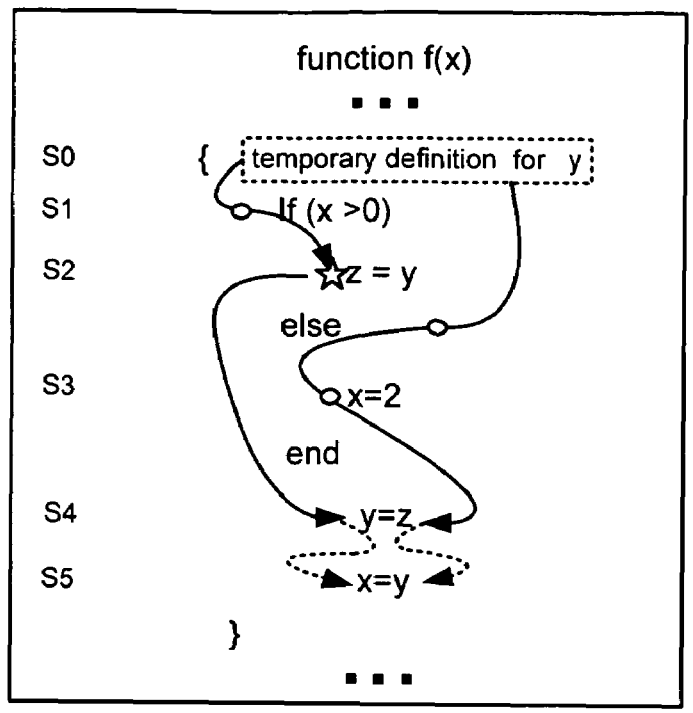
FIGS. 14A and 14B illustrate, in a block diagram, a program where variable renaming will decrease the number of dual usages found.
Figure 14B:
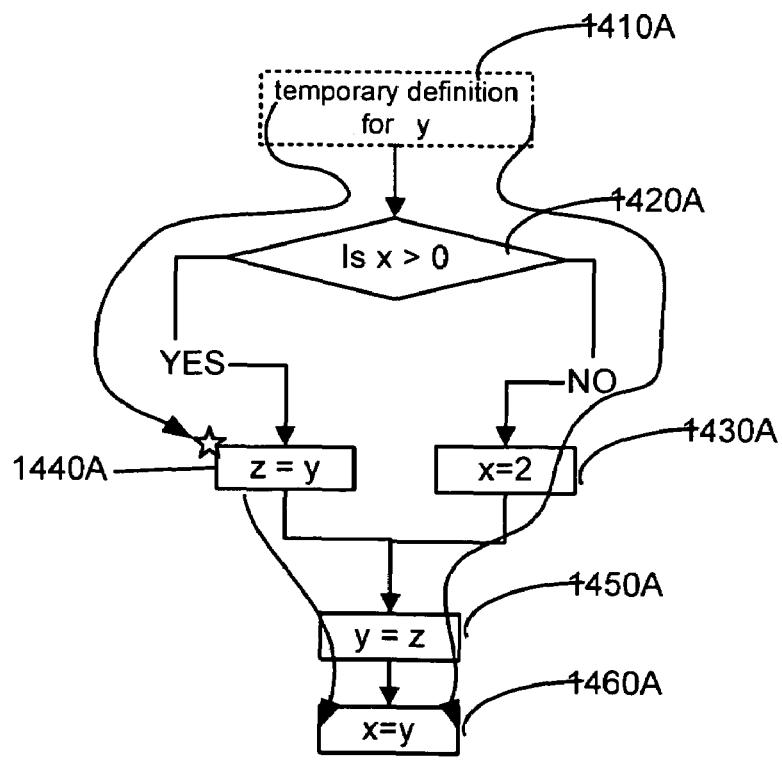
Figure 15A:
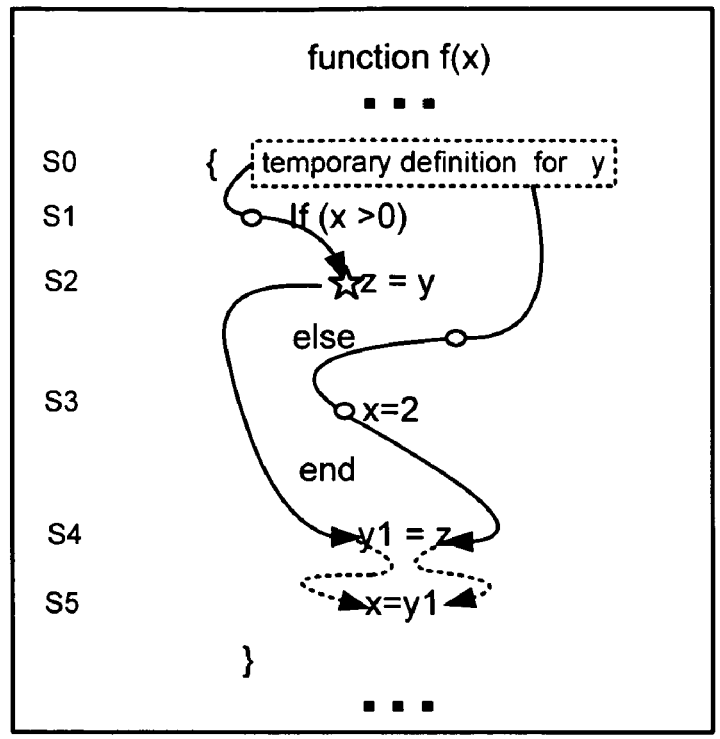
FIGS. 15A and 15B illustrate, in a block diagram, the effects of variable renaming on the program in FIGS. 14A and 14B.
Figure 15B:
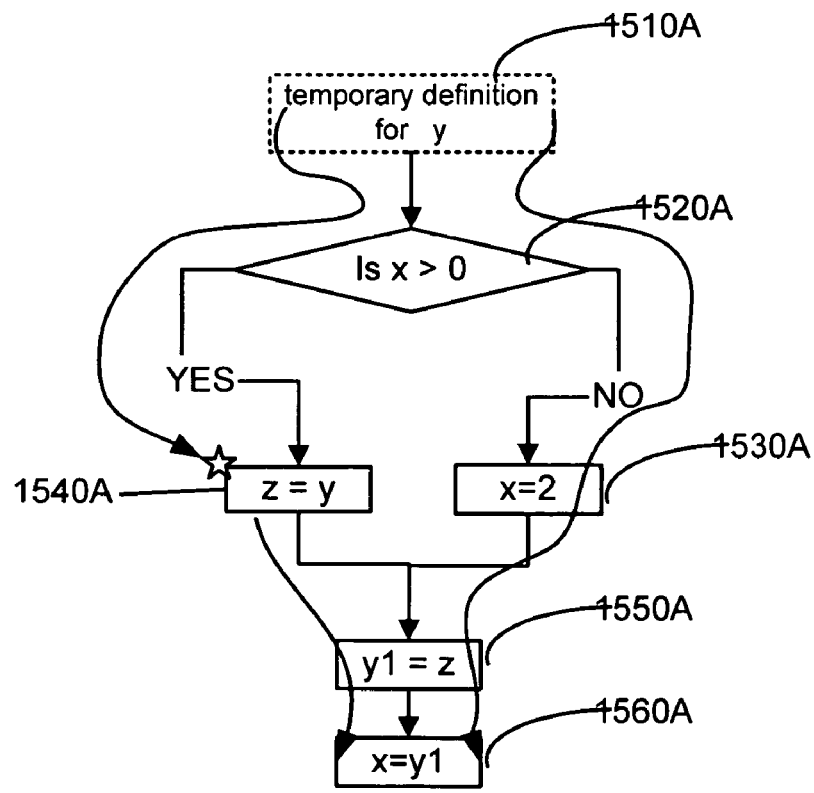

In FIG. 14A, statement S2 is reached by a temporary definition of "y" and is thus a function call. S4 defines a new value for "y" creating a permanent definition. Without variable renaming, the use of "y" in statement S5 of a MATLAB program appears to be both a function call and a memory access, creating a dual usage, thereby complicating the compilation of the program. The dual usage is created by the use of a single symbol "y" (in the user's program) to represent both a function call and a memory access. The choice is an artifact of the user's choice to reuse the same symbol; had he used a different symbol, no dual usage would exist. Several embodiments of the type described herein automatically separate the two distinct uses of the variable into two separate variables using variable renaming, thereby eliminating the dual usage. (For example, the second occurrence of symbol "y" is automatically replaced by the symbol "y1", as described next.)

FIGS. 15A and 15B illustrate the program after variable renaming as described in this embodiment has been applied. Since the use of "y" in statement S2 is in a different equivalence class than the definition of "y" in S4 and the use of "y" in S5, a new symbol "y1" has been created for the latter class. This allows the symbol "y" to be used as a function and the symbol "y1" to be used as an array, eliminating the dual usage. The names "y" and "y1" are for notational convenience; other names can equally well be used.

Figure 16:
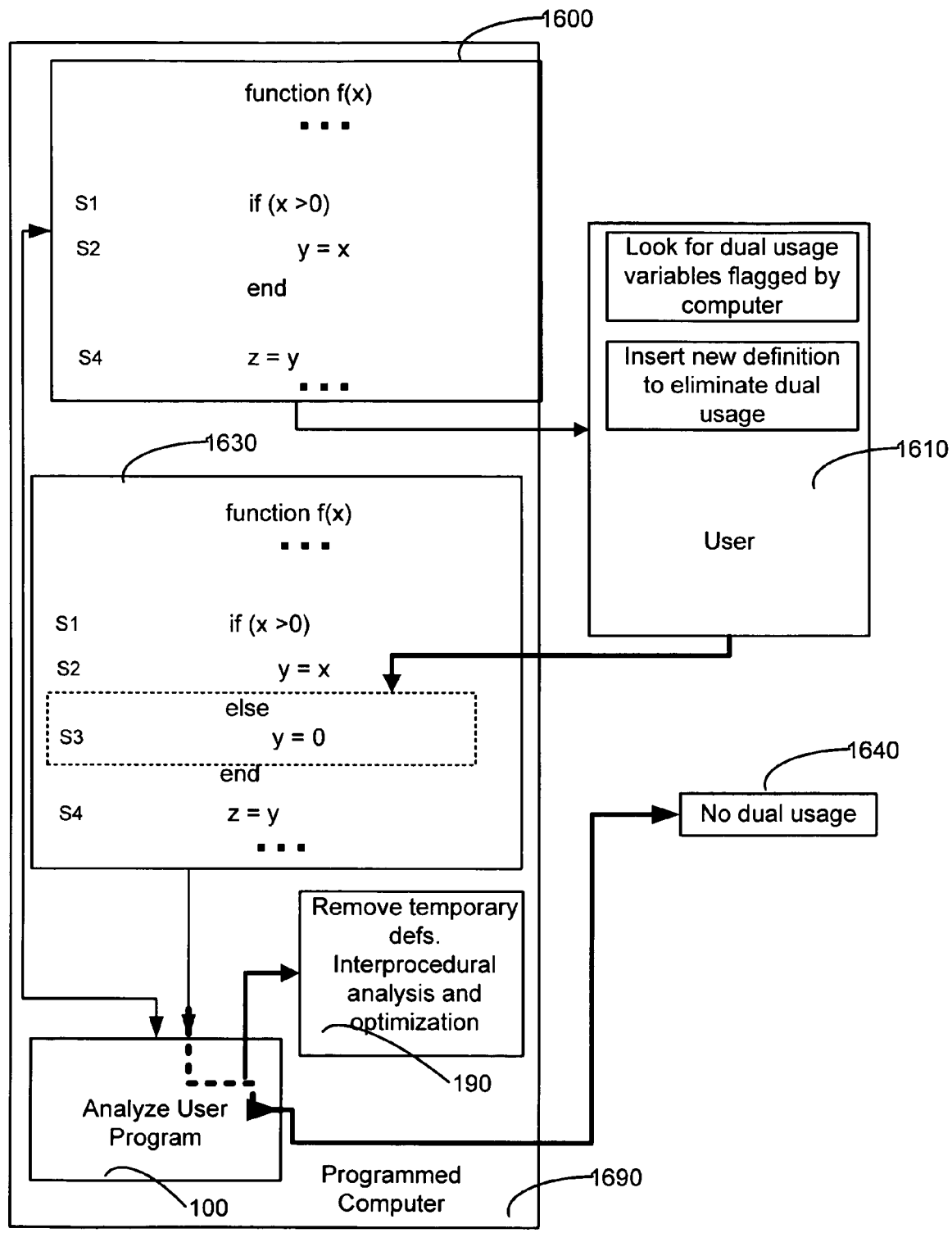
FIG. 16 illustrates, in a high level block diagram, one typical use of the invention.

FIG. 16 illustrates one typical use of some embodiments of the invention. A user 1610 prepares an initial version 1600 of a program written in a dynamically-typed, ambiguous language. The user 1610 then uses the programmed computer 1690 in accordance with the invention to analyze the program version 1600 for function calls, memory access, and dual usage. As may often be the case, program version 1600 in one example shown in FIG. 16 contains a dual usage for "y", which the programmed computer 1690 has automatically detected by performing an analysis operation 100 (of the type described above in reference to FIG. 1). In this embodiment, the user 1610 removes the dual usage in version 1600 by changing his program, producing the new version 1630 which is shown to have new statements inserted therein (in the dotted box).

Other embodiments automatically make changes such as loop unrolling or statement insertion to eliminate the dual usage, rather than having the user perform the task. Other embodiments (for instance, those involving interpreters or just-in-time compilers) leave the dual usage in the program to be resolved at run-time, and instead optimize the other portions of the program. After the program has been changed (either manually by user 1610 or automatically by computer 1690) the new version 1630 is analyzed again by the programmed computer 1690. At this stage, since the dual usage has been eliminated, the computer 1690 does not find a dual usage (which is reported to the user as indicated in message 1640 displayed on a monitor). This process is repeated any number of times until the entirety of the program has been analyzed and no dual usage is detected. At that point, interprocedural analysis and optimization are optionally performed, for example as indicated in act 190 (FIG. 1). During that act, temporary definitions inserted by the programmed computer are removed. In other embodiments, the temporary definitions are retained. Other embodiments bypass interprocedural analysis and proceed directly to code generation or interpretation.

Act 700 in FIG. 7A illustrates an embodiment that takes the most simplistic and inefficient approach for adding temporary definitions. In view of this disclosure, a skilled artisan will readily recognize that several improvements are possible based on syntactic (or equivalently, lexical) clues present in the language. FIGS. 17A-17D illustrate some programs and simplifications in embodiments based on the MATLAB language. In statement S1 in FIG. 17A, the variable "y" appears on the right side of an assignment to multiple values ("a", "b", and "c"). The MATLAB language allows a function to return multiple values (and thereby assign values to multiple variables in a single assignment), but it does not allow an array access to do that. As a result, if the only references to a variable such as "y" are as the source of multiple return values, then "y" can be inferred to be a function call, or if no appropriate function can be found, an erroneous program. Note that all references to "y" must meet the restriction. For instance, the assignment to "y" in statement S2 in the same program means that a full analysis would have to be performed. The "y" in statement S1 is a different variable from the "y" in statement S2 (as variable renaming as illustrated in FIG. 11 will reveal) and represents a memory access. Since this "y" has a use that is not in any way restricted by the MATLAB language, it must be added as a source for temporary definitions.

Figure 17A:
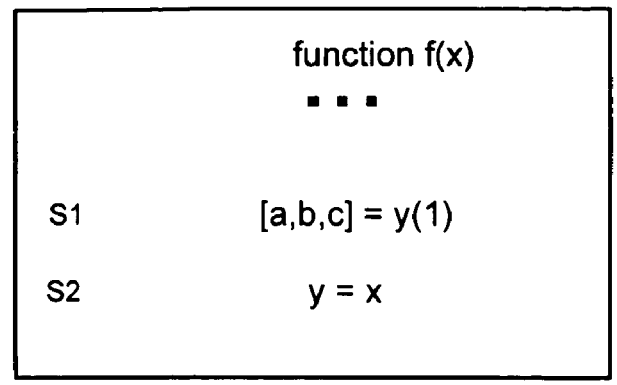
FIGS. 17A-17D illustrate, in high level block diagrams, programming constructs where syntactic simplification of the analysis is possible for embodiments supporting MATLAB.
Figure 17B:
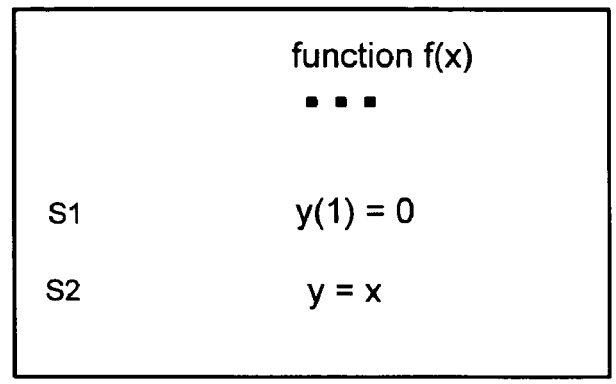
Figure 17C:
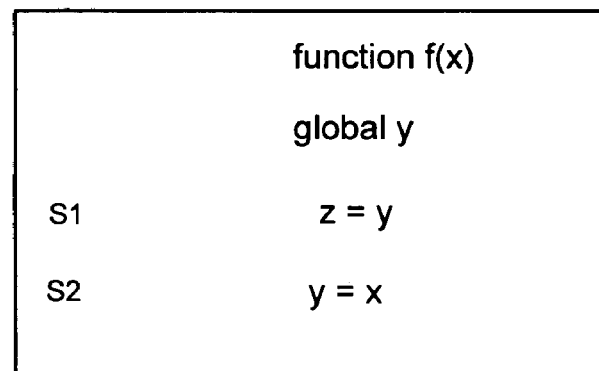
Figure 17D:
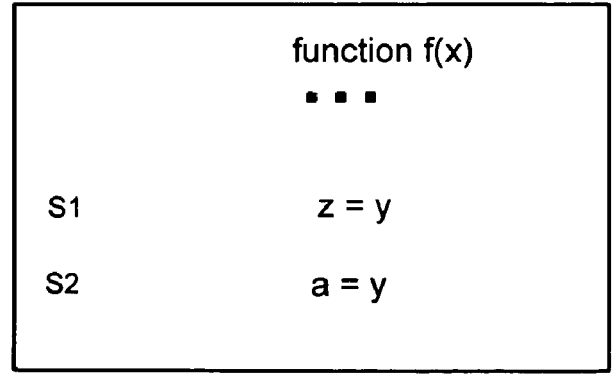

In FIG. 17B, the reference "y(1)" appears on the left hand side of the assignment. Since function calls cannot appear as targets of assignments in MATLAB, this implies that "y" must be an array reference. In FIG. 17C, "y" is stated to be a global variable, indicated by the prefix "global". In MATLAB, global variables can only be memory references; they cannot be function calls. In FIG. 17D, all occurrences of "y" are on the right hand side of assignment statements; "y" is not the target of any assignment. As a result, "y" is guaranteed to be a function call. When "y" occurs only on the right hand side of assignments, it is never defined in the program. Since it is never defined, there are no permanent definitions of "y" in the program. If there are no permanent definitions of "y" in the program, then no permanent definition of "y" can possibly reach a use.

In view of this disclosure, a skilled artisan will readily recognize other such simplifications. Note that all simplifications to act 700 (FIG. 7A) described in FIGS. 17A-17D can be determined from a simple lexical analysis (also called syntactic analysis) of the program, which is generally the first step in any compilation or interpretation system. For instance, the pattern in FIG. 17A can be recognized whenever a close bracket ("]") is followed by an equal sign ("=") is followed by a variable name. The pattern in FIG. 17B can be recognized whenever a variable is the first occurrence in a statement, and the statement contains an equal ("=") sign.

In several embodiments of the invention, a computer is programmed to at least partially resolve an ambiguous usage of a name in a statement of a computer program, by adding to an entry statement thereof a definition that includes the ambiguously used name (also called "temporary definition"), followed by constructing a definition-use graph, followed by checking whether or not an edge from the added definition reaches the statement containing the ambiguously used name (also called "ambiguous statement").

The foregoing description is presented to enable one to make and use the invention, and is provided in the context of a particular application and its requirements. It is not intended to be exhaustive or to limit the invention to the forms disclosed. Various modifications to the disclosed embodiments will be readily apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. Accordingly, many modifications and variations will be apparent. Numerous such modifications and adaptations of the embodiments and variants described herein are encompassed by the appended claims.

The invention claimed is:

1. A method for identifying ambiguities in a computer program, the method comprising:
   automatically adding to the computer program, a temporary definition that comprises a name existing in a statement in the computer program;
   wherein the computer program is expressed in a high level language that supports ambiguous usage of names as both function calls and memory accesses without an explicit indication therebetween;
   automatically checking if the temporary definition reaches said statement along a first control flow path and at least one permanent definition of said name reaches said statement along a second control flow path;
   wherein said at least one permanent definition pre-exists in said computer program prior to said automatically adding; and
   automatically identifying said statement as containing a dual use of the name for each of (function call and memory access) if a result of said automatically checking is true.

2. The method of claim 1 further comprising:
   automatically checking if the temporary definition reaches said statement along each control flow path and if true automatically identifying said statement as containing a call to a function; and
   automatically replacing said call to said function in said statement with a plurality of program instructions derived from a definition of said function.

3. The method of claim 1 wherein further comprising:
   automatically propagating said temporary definition along each control flow path that starts from said temporary definition in said computer program until said permanent definition or another permanent definition of said name is reached.

4. The method of claim 3 wherein during said automatically propagating:
   said temporary definition reaches said statement along a first control flow path; and
   said temporary definition reaches said permanent definition in another statement along a second control flow path; and
   wherein said another statement occurs in a sequence of statements between said temporary definition and said statement.

5. The method of claim 3 wherein during said automatically propagating:
   said temporary definition reaches said statement along a first control flow path;
   said temporary definition reaches said permanent definition in another statement along a second control flow path; and
   said permanent definition reaches said statement from said another statement along a continuation of the second control flow path.

6. The method of claim 1 further comprising:
   automatically constructing a structure of definitions and uses for a plurality of names in the computer program;
   wherein said automatically constructing is performed after said automatically adding, so that the structure relates at least said temporary definition to said statement, and the structure relates every use of a name in said computer program to at least one definition; and
   said structure relates said temporary definition to said use of said name in said statement.

7. The method of claim 6 further comprising, subsequent to said automatically constructing and prior to said automatically identifying:
   automatically marking with a first flag each statement related by said structure to said temporary definition;
   automatically with a second flag each statement related by said structure to said permanent definition; and
   checking if said statement is marked with each of said first flag and said second flag.

8. The method of claim 6 further comprising:
   automatically using said structure to identify equivalence classes for said name; and
   automatically renaming said name uniquely in each equivalence class.

9. The method of claim 8 wherein:
   said using and said renaming are performed subsequent to said constructing and prior to said identifying.

10. The method of claim 8 wherein:
    said using and said renaming are performed subsequent to said identifying.

11. The method of claim 1 further comprising:
    forming a plurality of flags comprising at least one set for each statement in the computer program, wherein flags in said set represent definitions of names in said computer program and for said statement a flag in the set when ON indicates that a definition represented by the flag reaches said statement and when OFF indicates that the definition represented by the flag does not reach said statement; and
    wherein said automatically checking comprises checking if in a set of flags for said statement, a flag representing said temporary definition is ON and if another flag representing said permanent definition is also ON.

12. The method of claim 1 further comprising:
    forming a plurality of flags comprising at least three sets for each statement in the computer program, wherein flags in each set represent definitions of names in said computer program, said forming comprising:
    turning on a first flag in a first set if the definition represented by the first flag occurs in said statement and turning off the first flag OFF if the definition represented by the first flag does not occur in said statement;
    turning on a second flag in a second set if the definition represented by the second flag is used in said statement and turning off the second flag if the definition is not used in said statement;
    turning off a third flag in a third set if the definition represented by the third flag is not killed in said statement and turning on the third flag if the definition represented by the third flag is being killed by a definition in said statement; and
    using said three sets of flags to form a fourth set of flags wherein a fourth flag when on indicates that a definition represented by the fourth flag reaches said statement and the fourth flag when off indicates that the definition represented by the fourth flag does not reach said statement.

13. The method of claim 1 further comprising:
    forming a plurality of tree nodes, said plurality of tree nodes comprising at least one node for each statement in the computer program;

wherein a tree node for said statement is automatically selected to be of a predetermined type indicating ambiguous usage if the name in said statement cannot be definitively determined from lexical analysis to be one of (memory access and function call);

forming a plurality of edges, each edge being connected between two nodes in said plurality of tree nodes, said plurality of edges comprising at least one edge for each control flow path reaching said statement;

automatically marking an edge into said tree node for said statement with a first flag if said statement is reachable by the temporary definition through said edge;

automatically marking the edge into said tree node with a second flag if said statement is reachable by said permanent definition through said edge;

repeating one of said automatically markings until all edges into said tree node are marked; and checking if at least one edge into said tree node is marked with said first flag and if at least another edge into said tree node is marked with said second flag.

14. The method of claim 13 further comprising:
replacing said tree node with another tree node if a result of said checking is false.

15. The method of claim 1 further comprising:
automatically building a call graph for said computer program if no statement of said computer program contains dual use of any name.

16. The method of claim 15 further comprising:
automatically replacing a call to a function in the call graph with a plurality of program instructions that perform said function, said plurality of program instructions being derived from a definition of said function and tailored to said call.

17. The method of claim 15 further comprising:
performing iterative flow analysis on said call graph to determine propagation of constants.

18. The method of claim 1 further comprising:
manually changing said computer program to eliminate the dual use in said statement, thereby to obtain a corrected version of said computer program; and
compiling said corrected version of said computer program without said temporary definition.

19. The method of claim 18 further comprising, during said compiling:
automatically constructing another structure of definitions and uses that lacks said definition;
automatically using said another structure of definitions and uses to mark uses within said computer program as being function calls or memory accesses;
automatically constructing for said computer program a structure indicating the calling relationship among functions based on said marked uses; and
automatically using said structure indicating the calling relationship to improve said computer programs execution characteristics.

20. The method of claim 1 wherein:
said automatically adding is performed for every name existing in said computer program.

21. The method of claim 1 further comprising:
automatically performing lexical analysis on said computer program based on a grammar of said high level language;
automatically applying at least one predetermined rule, based on said lexical analysis, to check if said name can be definitively determined to be one of (memory access and function call); and performing said automatically adding only if a result of said check is negative.

22. The method of claim 21 wherein said predetermined rule comprises determining that said name is definitively a memory access by:
checking if at least said name followed by an open parenthesis is a target of an assignment on the left side of the "=" symbol in said statement.

23. The method of claim 21 wherein said predetermined rule comprises determining that said name is definitively a function call by:
checking if said name is not explicitly defined in any statement of said computer program.

24. The method of claim 21 wherein said predetermined rule comprises determining that said name is definitively a function call by:
checking if said name used as a multi-return function, invoked in said statement.

25. The method of claim 1 wherein said automatically adding comprises:
inserting said temporary definition in an entry statement in source code of said computer program.

26. The method of claim 1 wherein said automatically adding comprises:
inserting a temporary statement comprising said temporary definition, subsequent to an entry statement in source code of said computer program.

27. The method of claim 1 wherein said automatically adding comprises:
modifying data structures used during construction of said plurality of nodes and edges such that said temporary definition appears to be in the program, without inserting a temporary statement comprising said temporary definition directly into said computer program or representation.

28. The method of claim 1 further comprising, prior to any of (said automatically adding, said automatically constructing and said automatically identifying):
automatically translating said computer program into an intermediate representation modeled by a tree comprising a plurality of tree nodes and a plurality of tree edges; and
automatically marking a tree node for said statement as containing an ambiguous usage of said name, based on a grammar of said high level language.

29. The method of claim 28 wherein said automatically adding comprises:
inserting in said tree a temporary node for said temporary definition;
wherein said temporary node is inserted at a location in said tree prior to said tree node and subsequent to an entry node of a function modeled by said tree.

30. The method of claim 28 wherein said automatically adding comprises:
inserting said temporary definition to an entry node of a function modeled by said tree.

31. The method of claim 28 wherein said automatically adding comprises:
inserting said temporary definition into a list of variables output by said statement;
wherein said list is associated with said tree node for said statement.

32. The method of claim 1 wherein said automatically constructing comprises:
forming a plurality of nodes in said structure, one node for each statement in the computer program; and adding a plurality of edges to said structure, such that each edge connects a first node, either directly or indirectly, to a second node if a definition in the first node can reach a use in the second node;

wherein said structure relates said temporary definition to said statement by an edge in said plurality of edges.

33. The method of claim 1 further comprising,:

automatically performing an additional check to see if only the temporary definition reaches said statement along all control flow paths; and automatically identifying said statement as containing a call to a function of said name if the result of said additional check is true;

automatically searching for said function with said name at all locations identified by at least one predetermined path; and automatically flagging said name in said statement as being undefined if said function is not found during said searching.

34. The method of claim 1 further comprising, automatically performing an additional check to see if the temporary definition does not reach said statement along any control flow path; and:

automatically identifying said statement as containing a memory access of said name if the result of said additional check is true; and automatically mapping said name to a specific location in physical memory of a size specified in said computer program.

35. The method of claim 1 wherein:
said structure comprises a graph.

36. The method of claim 1 wherein:
said structure comprises a plurality of bit vectors.

37. A method executed in a computer for at least partially resolving ambiguities in a computer program expressed in a high level language, the method comprising:

adding to said computer program, a definition comprising a name if said name is used ambiguously as both a function call and a memory access in a statement in said computer program;

constructing a graph of definitions and uses for a plurality of names including said name; and identifying usage of said name in said statement to be definitively a memory access if in said graph all edges into said statement are from a pre-existing definition in said computer program.

38. A method executed in a computer for at least partially resolving ambiguities in a computer program expressed in a high level language, the method comprising:

translating said computer program into an intermediate representation, wherein said intermediate representation models at least one statement in said computer program, said at least one statement comprising an ambiguous usage of a name as both a function call and an memory access;

adding to an entry statement of said computer program, a definition comprising said name, said definition being marked artificial;

constructing a graph of definitions and uses for a plurality of names including said name in said computer program, by adding a plurality of edges such that each edge connects a node in the intermediate representation, either directly or indirectly, to another node in the intermediate representation; and identifying usage of said name in said statement as a function call if in said definition-use graph all edges into said statement are from said artificial definition, and alternatively as a memory access if all edges into said statement are not from said artificial definition, and alternatively flagging said statement as a dual use.

39. A computer-readable storage medium encoded with a computer program and further comprising:

a plurality of flags comprising at least four sets for each statement in the computer program, wherein flags in each set represent definitions of names in said computer program and for said statement:

a first flag in a first set when ON indicates that the definition represented by the first flag occurs in said statement and when OFF indicates that the definition represented by the first flag does not occur in said statement;

a second flag in a second set when ON indicates that the definition represented by the second flag is used in said statement and when OFF indicates that that the definition is not used in said statement;

a third flag in a third set when OFF indicates that the definition represented by the third flag is not killed in said statement and when ON indicates that the definition represented by the third flag is being killed by a definition in said statement;

a fourth flag in a fourth set when ON indicates that a definition represented by the fourth flag reaches said statement and when OFF indicates that the definition represented by the fourth flag does not reach said statement.

40. A computer-readable storage medium encoded with a computer program and further comprising a definition-use structure, said structure comprising:

a plurality of permanent nodes, one permanent node for each occurrence of a name in the computer program; and a plurality of temporary nodes, wherein each temporary node is for a statement in the computer program that is of a predetermined type indicating ambiguous usage wherein the name in said statement cannot be definitively determined from lexical analysis to be one of (memory access and function call); and a plurality of edges, wherein each edge connects a first node, either directly or indirectly, to a second node if a definition in the first node can reach a use in the second node, regardless of whether the first node is temporary or permanent.

* * * * *